United States Patent
Ryoo et al.

(10) Patent No.: US 10,560,905 B2
(45) Date of Patent: Feb. 11, 2020

(54) METHOD AND APPARATUS FOR TRANSMITTING POWER HEADROOM INFORMATION IN A COMMUNICATION SYSTEM

(71) Applicant: Samsung Electronics Co., Ltd., Suwon-si, Gyeonggi-do (KR)

(72) Inventors: Sunheui Ryoo, Yongin-si (KR); Jungsoo Jung, Suwon-si (KR); Hyunjeong Kang, Seoul (KR); Hyunseok Ryu, Yongin-si (KR); Seunghoon Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/971,510

(22) Filed: May 4, 2018

(65) Prior Publication Data

US 2018/0324715 A1    Nov. 8, 2018

(30) Foreign Application Priority Data

May 4, 2017   (KR) .................. 10-2017-0057013
Jun. 15, 2017  (KR) .................. 10-2017-0076154

(51) Int. Cl.
*H04L 12/801*   (2013.01)
*H04L 12/24*    (2006.01)
(Continued)

(52) U.S. Cl.
CPC ......... *H04W 52/365* (2013.01); *H04L 5/0007* (2013.01); *H04L 5/0053* (2013.01);
(Continued)

(58) Field of Classification Search
CPC .. H04W 52/365; H04W 76/18; H04L 27/008; H04L 5/007; H04L 27/2636
See application file for complete search history.

(56) References Cited

U.S. PATENT DOCUMENTS

| 2010/0067591 A1 | 3/2010 | Luo et al. |
| 2012/0163305 A1 | 6/2012 | Nimbalker et al. |

(Continued)

OTHER PUBLICATIONS

ISA/KR, International Search Report for International Application No. PCT/US2018/005195, dated Aug. 16, 2018, 3 pages.

(Continued)

*Primary Examiner* — Faruk Hamza
*Assistant Examiner* — Abusayeed M Haque

(57) ABSTRACT

The present disclosure relates to a communication method and system for converging a 5th-generation (5G) communication system for supporting higher data rates beyond a 4th-generation (4G) system with a technology for internet of things (IoT). The present disclosure may be applied to intelligent services based on the 5G communication technology and the IoT-related technology, such as smart home, smart building, smart city, smart car, connected car, health care, digital education, smart retail, security and safety services. In addition, a method of a terminal in a wireless communication system, includes: receiving system information including first uplink waveform information for an initial access; transmitting a radio resource control (RRC) connection request message based on the first uplink waveform information; receiving an RRC connection response message including second uplink waveform information for uplink data transmission; and transmitting data based on the second uplink waveform.

16 Claims, 31 Drawing Sheets

(51) Int. Cl.
   *H04L 5/14*     (2006.01)
   *H04L 29/06*    (2006.01)
   *H04W 52/36*    (2009.01)
   *H04W 24/10*    (2009.01)
   *H04W 72/04*    (2009.01)
   *H04W 52/14*    (2009.01)
   *H04W 16/28*    (2009.01)
   *H04W 76/27*    (2018.01)
   *H04L 27/26*    (2006.01)
   *H04L 5/00*     (2006.01)
   *H04W 48/12*    (2009.01)
   *H04W 76/18*    (2018.01)
   *H04L 27/00*    (2006.01)

(52) U.S. Cl.
   CPC ...... *H04L 27/0008* (2013.01); *H04L 27/2636* (2013.01); *H04L 27/2646* (2013.01); *H04W 16/28* (2013.01); *H04W 24/10* (2013.01); *H04W 48/12* (2013.01); *H04W 52/146* (2013.01); *H04W 72/0406* (2013.01); *H04W 76/18* (2018.02); *H04W 76/27* (2018.02)

(56) References Cited

U.S. PATENT DOCUMENTS

| | | | |
|---|---|---|---|
| 2014/0329551 A1 | 11/2014 | Ryoo et al. | |
| 2015/0085797 A1 | 3/2015 | Ji et al. | |
| 2015/0354947 A1* | 12/2015 | Kondo | G01B 11/303 |
| | | | 356/600 |
| 2017/0331670 A1* | 11/2017 | Parkvall | H04W 52/0274 |
| 2017/0332417 A1* | 11/2017 | Tenny | H04W 16/28 |
| 2017/0367058 A1* | 12/2017 | Pelletier | H04W 56/0045 |
| 2018/0092086 A1* | 3/2018 | Nammi | H04L 27/264 |
| 2018/0109995 A1* | 4/2018 | Akkarakaran | H04W 48/12 |

OTHER PUBLICATIONS

Interdigital Communications, "Beam management of multiple beam pairs in uplink," R2-1702883, 3GPP TSG-RAN WG2 Meeting #97bis, Spokane, Washington, Apr. 3-7, 2017, 4 pages.

Samsung, "PHR with beam mismatch between downlink and uplink," R2-1703356, 3GPP TSG-RAN WG2 Meeting #97bis, Spokane, US, Apr. 3-7, 2017, 4 pages.

* cited by examiner

FIG. 19
PH format for beam index
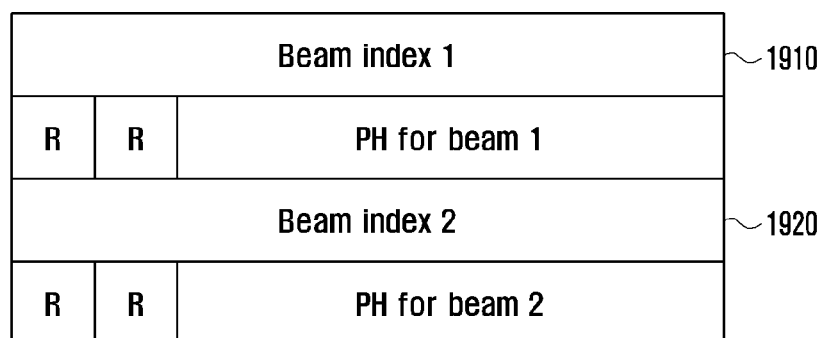
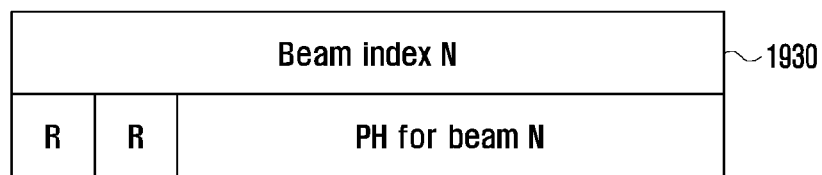

FIG. 20
PH format for TRxP beam index
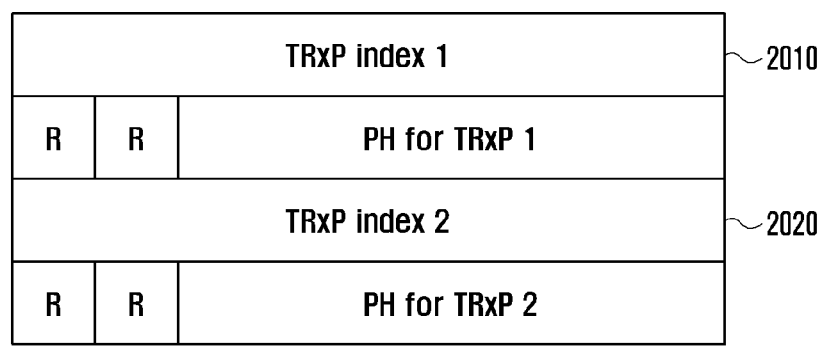
...
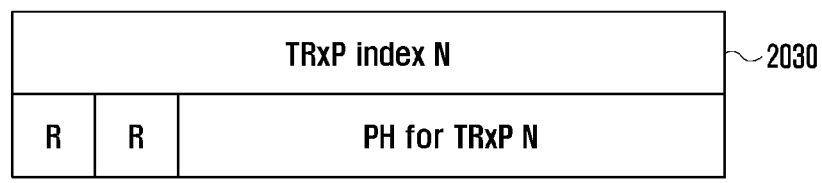

METHOD AND APPARATUS FOR TRANSMITTING POWER HEADROOM INFORMATION IN A COMMUNICATION SYSTEM

CROSS-REFERENCE TO RELATED APPLICATIONS AND CLAIM OF PRIORITY

This application is based on and claims priority under 35 U.S.C. § 119 to Korean Patent Application No. 10-2017-0057013, filed on May 4, 2017, and to Korean Patent Application No. 10-2017-0076154, filed on Jun. 15, 2017 in the Korean Intellectual Property Office, the disclosure of which is incorporated by reference herein in its entirety.

BACKGROUND

1. Field

Various embodiments of the present disclosure relate to a communication system, and more particularly, to a method and apparatus for transmitting and receiving power headroom information in a communication system.

2. Description of Related Art

To meet the demand for wireless data traffic having increased since deployment of 4G communication systems, efforts have been made to develop an improved 5G or pre-5G communication system. Therefore, the 5G or pre-5G communication system is also called a "beyond 4G network" or a "post LTE system." The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like. In the 5G system, hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the internet of things (IoT) where distributed entities, such as things, exchange and process information without human intervention. The internet of everything (IoE), which is a combination of the IoT technology and the Big Data processing technology through connection with a cloud server, has emerged. As technology elements, such as "sensing technology," "wired/wireless communication and network infrastructure," "service interface technology," and "Security technology" have been demanded for IoT implementation, a sensor network, a machine-to-machine (M2M) communication, machine type communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies such as a sensor network, machine type communication (MTC), and machine-to-machine (M2M) communication may be implemented by beamforming, MIMO, and array antennas. Application of a cloud radio access network (RAN) as the above-described Big Data processing technology may also be considered to be as an example of convergence between the 5G technology and the IoT technology.

Meanwhile, in the conventional LTE, the terminal transmits power headroom information to the base station on an uplink. At this time, a power headroom value means a difference between a maximum transmission power of the terminal and a transmission power actually used for an uplink transmission by the terminal. The base station may use a method for using power headroom information received from a terminal to optimize system performance. For example, if the power headroom information received from the terminal is a positive value, the base station may determine that the corresponding terminal may increase the uplink transmission power to increase the amount of resources which may be allocated to the corresponding terminal upon scheduling of the corresponding terminal. On the contrary, if the power headroom information received from the terminal is a negative value, the base station may determine that the corresponding terminal may reduce the uplink transmission power to reduce the amount of resources which may be allocated to the corresponding terminal upon scheduling of the corresponding terminal. With this operation, coverage of data (or control information) transmitted on the uplink may be ensured and the power consumption of the terminal may be reduced.

Since the operation of transmitting and receiving the power headroom information of the base station and the terminal is required even in the 5G communication system using the beamforming, it is necessary to design a method and apparatus for transmitting power headroom information in a beamforming system.

SUMMARY

Accordingly, embodiments of the present disclosure are directed to the provision of a method and an apparatus for operating a terminal and a base station for reducing delay for a transmission of terminal power headroom information in a communication system.

Another object of the present disclosure is directed to provision of a method and an apparatus for operating a terminal and a base station for transmitting terminal power headroom information according to a change in beam in a beamforming system.

Objects of the present disclosure are not limited to the above-mentioned objects. That is, other objects that are not mentioned may be obviously understood by those skilled in the art to which the present disclosure pertains from the following description.

Various embodiments of the present disclosure are directed to the provision of a method of a terminal in a wireless communication system, including: receiving system information including first uplink waveform information for an initial access; transmitting a radio resource control RRC connection request message based on the first uplink waveform information; receiving an RRC connection response message including second uplink waveform information for uplink data transmission; and transmitting data based on the second uplink waveform.

Various embodiments of the present disclosure are directed to the provision of a method of a base station in a wireless communication system, including: transmitting system information including first uplink waveform information for an initial access; receiving a radio resource control RRC connection request message based on the first uplink waveform information; transmitting an RRC connection response message including second uplink waveform information for uplink data transmission; and receiving data based on the second uplink waveform.

Various embodiments of the present disclosure are directed to the provision of a terminal in a wireless communication system, including: a transceiver; and a controller configured to: receive system information including first uplink waveform information for an initial access; transmit a radio resource control RRC connection request message based on the first uplink waveform information; receive an RRC connection response message including second uplink waveform information for uplink data transmission; and transmit data based on the second uplink waveform.

Various embodiments of the present disclosure are directed to the provision of a base station in a wireless communication system, including: a transceiver; and a controller configured to: transmit system information including first uplink waveform information for an initial access; receive a radio resource control RRC connection request message based on the first uplink waveform information; transmit an RRC connection response message including second uplink waveform information for uplink data transmission; and receive data based on the second uplink waveform.

According to the embodiment of the present disclosure, the method for transmitting power headroom information can previously perform the uplink (UL) resource allocation for the transmission of the power headroom information to reduce a delay of uplink transmission upon the transmission of the cell level mobility or beam level mobility control signal in the communication system.

In addition, according to the embodiment of the present disclosure, it is possible to maximize the system performance and to reduce the power consumption of the terminal by transmitting the terminal power headroom information according to the change in beam in the system using the beamforming.

The effects that may be achieved by the embodiments of the present disclosure are not limited to the above-mentioned objects. That is, other effects that are not mentioned may be obviously understood by those skilled in the art to which the present disclosure pertains from the following description.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 19 is illustrates an example of a MAC CE format for the transmission of the power headroom information considering the beamforming (example of applying PH per beam).

FIG. 20 is illustrates another example of the MAC CE format for the transmission of the power headroom information considering the beamforming (example of applying PH per TRxP).

DETAILED DESCRIPTION

Figure 1:
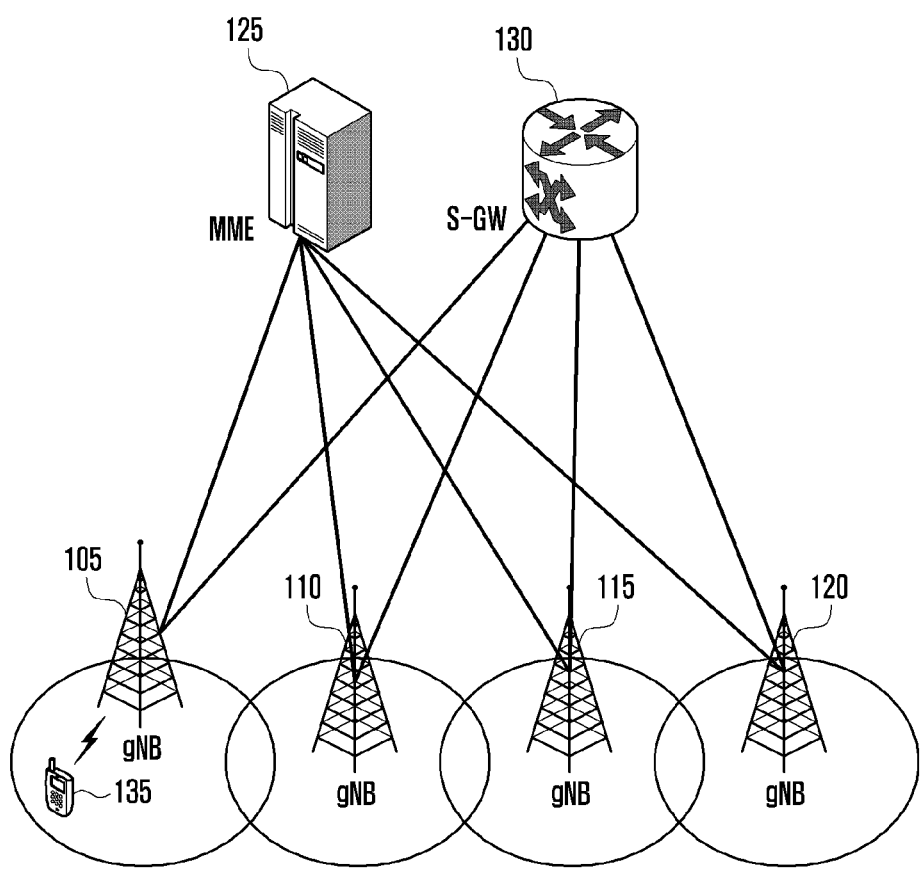
FIG. 1 schematically illustrates a structure of a (5G, NR) communication system according to an embodiment of the present disclosure, and is an example of a configuration of an MME, an S-GW, and a 5G base station (gNB).

FIGS. 1 through 28, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Hereinafter, embodiments of the present disclosure will be described in detail with reference to the accompanying drawings. When it is decided that a detailed description for the known function or configuration related to the present disclosure may obscure the gist of the present disclosure, the detailed description therefor will be omitted. Further, the following terminologies are defined in consideration of the functions in the present disclosure and may be construed in different ways by the intention or practice of users and operators. Therefore, the definitions thereof should be construed based on the contents throughout the specification.

Various advantages and features of the present disclosure and methods accomplishing the same will become apparent from the following detailed description of embodiments with reference to the accompanying drawings. However, the present disclosure is not limited to the embodiments disclosed herein but will be implemented in various forms. The embodiments have made disclosure of the present disclosure complete and are provided so that those skilled in the art can easily understand the scope of the present disclosure. Therefore, the present disclosure will be defined by the scope of the appended claims. Like reference numerals throughout the description denote like elements.

Further, it may be understood that each block of processing flow charts and combinations of flow charts may be performed by computer program instructions. Since these computer program instructions may be mounted in processors for a general computer, a special computer, or other programmable data processing apparatuses, these instructions executed by the processors for the computer or the other programmable data processing apparatuses create means performing functions described in block(s) of the flow charts. Since these computer program instructions may also be stored in a computer usable or computer readable memory of a computer or other programmable data processing apparatuses in order to implement the functions in a specific scheme, the computer program instructions stored in the computer usable or computer readable memory may also produce manufacturing articles including instruction means performing the functions described in block(s) of the flow charts. Since the computer program instructions may also be mounted on the computer or the other programmable data processing apparatuses, the instructions performing a series of operation steps on the computer or the other programmable data processing apparatuses to create processes executed by the computer to thereby execute the computer or the other programmable data processing apparatuses may also provide steps for performing the functions described in block(s) of the flow charts.

In addition, each block may indicate some of modules, segments, or codes including one or more executable instructions for executing a specific logical function (s) Further, it is to be noted that functions mentioned in the blocks occur regardless of a sequence in some alternative embodiments. For example, two blocks that are consecutively illustrated may be simultaneously performed in fact or be performed in a reverse sequence depending on corresponding functions sometimes.

Here, the term "~unit" used in the present embodiment means software or hardware components such as FPGA and ASIC and the "~unit" performs any roles. However, the meaning of the "~unit" is not limited to software or hardware. The "~unit" may be configured to be in a storage medium that may be addressed and may also be configured to reproduce one or more processor. Accordingly, for example, the "~unit" includes components such as software components, object oriented software components, class components, and task components and processors, functions, attributes, procedures, subroutines, segments of program code, drivers, firmware, microcode, circuit, data, database, data structures, tables, arrays, and variables. The functions provided in the components and the "~units" may be combined with a smaller number of components and the "~units" or may be further separated into additional components and "~units." In addition, the components and the "~units" may also be implemented to reproduce one or more CPUs within a device or a security multimedia card.

Hereinafter, embodiments of the present disclosure will be described in detail with reference to the accompanying drawings. When it is decided that a detailed description for the known function or configuration related to the present disclosure may obscure the gist of the present disclosure, the detailed description therefor will be omitted. Further, the following terminologies are defined in consideration of the functions in the present disclosure and may be construed in different ways by the intention or practice of users and operators. Therefore, the definitions thereof should be construed based on the contents throughout the specification.

A power headroom refers to a difference between current transmission power of a terminal and maximum output power of the terminal, and the terminal may calculate the power headroom as shown in Equation 1 as given by:

$$PH(i) = P_{CMAX}(i) - P_{TX}(i) \tag{1}$$

The above Equation 1 refers to a power headroom value that the terminal calculates in an i-th subframe of the terminal, which may be formed of a difference between transmission power $P_{TX}(i)$ that the terminal actually uses for a transmission of uplink data and control information and maximum output power $P_{CMAX}(i)$ of the terminal. The $P_{TX}(i)$ may vary depending on whether to transmit the data information or the control information or simultaneously transmit the data information and the control information in the i-th subframe. The following Equation 2a is an example of the $P_{TX}(i)$ for the case of transmitting data information in the i-th subframe, and the following Equation 2b is an example of the $P_{TX}(i)$ for the case of transmitting the control information in the i-th subframe:

$$P_{TX}(i) = 10 \log_{10}(M_{PUSCH}(i)) + P_{0\_PUSCH}(j) + \alpha(j) \cdot \Delta_{TF}(i) + f(i) \text{ [dBm]} \tag{2a}$$

The above Equation 2a illustrates transmission power of a physical uplink shared channel (PUSCH), which is a physical channel for the transmission of the uplink data in the i-th subframe of the terminal.

At this time, $P_{0\_PUSCH}$ is a parameter consisting of $P_{0\_NORMAL\_PUSCH} + P_{0\_UE\_PUSCH}$, and is a value that the base station informs the terminal by higher layer signaling (RRC signaling).

In particular, $P_{O\_NORMAL\_PUSCH}$ is a cell-specific value consisting of 8-bit information and has a range of [−126, 24] dB.

In addition, $P_{O\_UE\_PUSCH}$ is a UE-specific value consisting of 4-bit information and has a range of [−8, 7] dB. The cell-specific value is transmitted from the base station by cell-specific RRC signaling (SIB: System Information Block), and the UE-specific value is transmitted to the terminal through dedicated RRC signaling.

At this time, j means a grant scheme of the PUSCH. More specifically, j=0 means a semi-persistent grant, j=1 means a dynamic scheduled grant, and j=2 means a PUSCH grant for a random access response. Meanwhile, α(j) is a value for compensating for a path-loss. In the case of α(0) and α(1), the base station cell-specifically informs all the terminals of one of {0, 0.4, 0.5, 0.6, 0.7, 0.8, 0.9, 1} by 3-bit information. A value of α(2)=1 is used.

PL is the path-loss value calculated by the terminal and is calculated by received power of a cell-specific reference signal (CRS) of a downlink channel that the base station transmits. $\Delta_{TF}(i)$ is a value related to MCS, and f(i) is a parameter for performing power control in a closed-loop:

$$P_{TX}(i)=P_{0\_PUCCH}+PL+h(n_{CQI},n_{HARQ},n_{SR})+ \Delta_{F\_PUCCH}(F)+\Delta_{TxD}(F')+g(i) \text{ [dBm]} \quad (2b)$$

The above Equation 2b shows transmission power of a physical uplink control channel (PUCCH), which is a physical channel for the transmission of the uplink control information in the i-th subframe of the terminal.

At this time, $P_{0\_PUCCH}$ is a parameter consisting of $P_{0\_NORMAL\_PUCCH}+P_{0\_UE\_PUCCH}$, and is a value that the base station informs the terminal by higher layer signaling (RRC signaling).

In particular, $P_{0\_NORMAL\_PUCCH}$ is a cell-specific value consisting of 8-bit information and has a range of [−126, 24] dB.

In addition, $P_{0\_UE\_PUCCH}$ is a UE-specific value consisting of 4-bit information and has a range of [−8, 7] dB. The cell-specific value is transmitted from the base station by cell-specific RRC signaling (SIB), and the UE-specific value is transmitted to the terminal through dedicated RRC signaling. Meanwhile, unlike the transmission power control of the PUSCH, α(j) compensating for the path-loss is not used in the transmission power control of the PUCCH.

Similar to the transmission power control of the PUSCH, the PL which is the path-loss value calculated by the terminal is calculated by received power of the CRS of a downlink channel that the base station transmits. The $\Delta_{F\_PUCCH}(F)$ is transmitted to the terminal by the higher layer signaling (cell-specific or UE-specific RRC signaling) and is a value varying depending on a format of the PUCCH.

$\Delta_{TxD}(F')$ is transmitted to the terminal by the higher layer signaling (cell-specific or UE-specific RRC signaling) when the PUCCH is transmitted to the 2-antenna ports (i.e., space frequency block code (SFBC)) and is a value which may vary depending on the format of the PUCCH.

$h(n_{CQI}, n_{HARQ}, n_{SR})$ are other values depending on the format of the PUCCH, where $n_{CQI}$ denotes the number of bits used for feedback of channel quality information, $n_{HARQ}$ denotes the number of bits used for feedback of HARQ-ACK/NACK, and $n_{SR}$ is 0 or 1 as a bit used for feedback of the scheduling request (SR). g(i) is a parameter for performing power control in a closed-loop, and the base station may UE-specifically correct the transmission power of the PUCCH.

On the other hand, $P_{CMAX}(i)$ representing the maximum output power of the terminal in the i-th subframe has a value in the range of the following Equation 3a and may be calculated by the terminal based on the following Equation 3b and Equation 3c as given by:

$$P_{CMAX\_L} \leq P_{CMAX} \leq P_{CMAX\_H} \quad (3a)$$

In the above Equation 3a, $P_{CMAX\_L}$ means a small value of $P_{CMAX}$, and may be calculated by the terminal based on the following Equation 3b. $P_{CMAX\_H}$ means a large value of the $P_{CMAX}$, and may be calculated by the terminal based on the following Equation 3c as given by:

$$P_{CMAX\_L}=\min\{P_{EMAX}-\Delta T_C, P_{PowerClass}-\text{Max}\{MPR+ AMPR+\Delta T_{IB}+\Delta T_C, PMPR\}\} \quad (3b)$$

$$P_{CMAX\_H}=\min\{P_{EMAX}, P_{PowerClass}\} \quad (3c)$$

In the above Equations 3b and 3c, $P_{EMAX}$ is the maximum transmission power that the terminal may use for uplink transmission in a specific cell, and is a value that the base station informs by the UE-specific RRC signaling. $P_{PowerClass}$ is a value corresponding to a power class of the terminal and may correspond to capability of the terminal (e.g., 23 dBm). A maximum power reduction (MPR) may reflect the amount of frequency resources (the number of RBs, the number of resource blocks) and modulation allocated to the terminal for the transmission of the uplink data and control channel. An additional maximum power reduction (AMPR) is a value which is based on an adjacent channel leakage ratio (ACLR) and spectral emission requirements. $\Delta T_{IB}$ is a tolerance value depending on a combination of bands in which communications are made, $\Delta T_C$ is a value varying depending on the aggregated channel bandwidth and the guard band, and a power amplifier-maximum power reduction (PMPR) is a parameter for complying with regulations in multi-RAT environment.

The terminal reports the power headroom value calculated based on the above Equation 1 to the base station, and the base station may use the power headroom value to optimize the system operation.

For example, if the power headroom value that the specific terminal reports to the base station is positive, the base station may increase a system yield by allocating more resource blocks (RBs) to the corresponding terminal. Unlike this, if the power headroom value that the specific terminal reports to the base station is negative, the base station may allocate less resources to the corresponding terminal or reduce the transmission power of the corresponding terminal by a transmission power control command. In this way, it is possible to reduce unnecessary power consumption of the corresponding terminal or to prevent performance deterioration in a reception signal of the base station due to an in-band emission.

On the other hand, in a system using beamforming, a mismatch between the downlink channel state and the uplink channel state may be greatly increased as compared with the system not using beamforming.

(1) For the first reason, a transmission beam gain for downlink transmission of the base station and a reception beam gain for uplink reception of the base station may be different from each other. Similarly, the reception beam gain for the downlink reception of the terminal and the transmission beam gain for the uplink transmission of the terminal may be different from each other. This is because the number of panels of the base station transmitting antenna may be different from the number of the panels of the base station receiving antenna and similarly, the number of panels of a terminal transmitting antenna may be different from the number of panels of a terminal receiving antenna. For example, the base station uses transmission power of 46 dBm for the downlink transmission, but the terminal can use transmission power of 23 dBm much less than the transmission power of the downlink transmission. Therefore, the coverage of the downlink signal and the coverage of the uplink signal may be different from each other.

In order to solve the above problem, the number of panels of the receiving antenna of the base station is increased (the number of panels of the receiving antenna is increased compared with the number of panels of the transmitting antenna of the base station), thereby increasing the reception beam gain of the base station to secure the coverage of the uplink signal. In addition, the number of panels of the transmitting antenna of the terminal is increased (the number of panels of the transmitting antenna is increased compared with the number of panels of the receiving antenna of the terminal) to increase the transmission beam gain of the terminal, thereby securing the uplink coverage.

(2) The second reason why the mismatch between the downlink channel state and the uplink channel state may be increased in the system using beamforming is that there may be different beam gains depending on the beam used by the base station and the beam-pair used by the terminal. For example, it is assumed that the base station uses N beams 1, 2, . . . , N and the terminal uses M beams 1, 2, . . . , M. The terminal may assume that a transmission beam 3 and a reception beam 1 of the base station may be the best beam, which is assumed to be the downlink best beam-pair. At this time, the best beam means the beam having the largest received signal. However, in terms of the reception of the base station, the transmission beam 2 of the terminal and the reception beam N of the base station may be the best beam, which is assumed to be the uplink best beam-pair. As described above, since the beam gains used for forming the downlink best beam-pair and the uplink best beam-pair may be different from each other, the mismatch may occur between the downlink channel state and the uplink channel state. As another example, even if the beam gains of the downlink best beam-pair and the uplink best beam-pair are the same, for a flexible beam operation, the base station may instruct the specific terminal to transmit the uplink data and the control information through an uplink second best beam-pair or an uplink third best beam-pair, not through the uplink best beam-pair. In this case, the mismatch between the downlink channel state and the uplink channel state may be increased.

(3) The third reason why the mismatch between the downlink channel state and the uplink channel state may be increased in the system using beamforming is that the base station and the terminal may use different beam widths when a synchronization signal, a control channel and a data channel are transmitted. More specifically, in the beamforming system, the synchronization signal, the control channel, and the data channel may be transmitted by performing beam sweeping. At this time, when the synchronization signal and the control channel (for example, physical broadcast channel (PBCH)) requiring broadcast or multicast are transmitted using a narrow beam width, the entire cell may be covered by the beam having the narrow beam width, such that the time required for the beam sweeping may be increased. Therefore, the synchronization signal and the control channel requiring the broadcast or multicast transmission needs to be transmitted using a beam having a wider beam width. In the present disclosure, transmitting the channel may mean transmitting the information through the channel, which may be interchangeably used.

On the other hand, since the control channel (for example, physical uplink control channel (PUCCH)) and the data channel (for example, physical uplink shared channel (PUSCH)) that need to be transmitted by the unicast are transmitted to the specific terminal, the control channel and the data channel need to be transmitted using the beam having the narrower beam width to secure the coverage and reduce the interference. In addition, when the downlink channel measurement is performed by a wider beam and the uplink transmission is performed by a narrower beam, the mismatch between the downlink channel state and the uplink channel state may be increased.

When the mismatch between the downlink channel state and the uplink channel state is increased in the beamforming system due to various reasons described above, the base station may have a serious problem in operating the system using the power headroom information calculated by the terminal over the downlink channel as in the above Equation 1. For example, if the power headroom value of the specific terminal is positive, the base station may increase the number of resources to be allocated to the terminal (i.e., increase the $M_{PUSCH}$ of the above Equation 2a), which may be the same as increasing the transmission power of the terminal. At this time, there may be the case in which the actual channel state of the uplink may mismatch the downlink channel state applied when the terminal calculates the power headroom, which may result in using less transmission power than the transmission power that the actual terminal may use. Therefore, there may be a problem in that the coverage of the uplink signal cannot be ensured.

As another example, when the actual channel state of the uplink mismatches the downlink channel state applied when the terminal calculates the power headroom, the transmission power higher than the transmission power that the actual terminal can use may be used. This may cause the unnecessary power consumption of the terminal. In addition, there may be the case in which the terminal transmits a signal at power greater than the terminal's maximum transmission output power (power greater than $P_{CMAX}$ in [Equation 1]). In this case, performance of an error vector magnitude (EVM) of signals that the terminal transmits on the uplink is degraded, thus reliability of the received signal of the uplink signal cannot be secured. In addition, when the transmission power higher than the transmission power that the actual terminal may transmit is used, if the terminal may be located close to the base station, the transmission power of the corresponding terminal exceeds a dynamic range of the base station receiver, thus interference may occur in the uplink signals of other terminals that the base station may receive (In-band emission). Therefore, it may be a main cause of deteriorating system performance.

In the beamforming system, as described above, the mismatch problem between the downlink channel and the uplink channel is increased due to the difference between the beam gains used in the downlink and the uplink, thus the reliability of the power headroom information that terminal transmits to the base station may be degraded. Therefore, a solution is needed to solve this problem.

As one embodiment for solving the first reason for increasing the mismatch between the downlink channel and the uplink channel described above, the base station may measure (or predict) the base station's own transmitting beam gain and receiving beam gain during a capability negotiation process between the base station and the terminal, and inform the terminal of the measured information. The terminal may also measure (or predict) the terminal's own transmitting beam gain and receiving beam gain and may inform the base station of the measured information. The terminal may apply the information to the calculation of the power headroom of the above Equation 1. More specifically, when the path-loss (PL) of the above Equations 2a and 2b is predicted, the terminal compares the transmission beam information of the base station transmitted from the base station with the reception beam information of the base station and uses the larger value of the transmission beam information and the reception beam information to predict the path-loss or uses the smaller value (or larger value) of the transmission beam information and the reception beam information or an average of the two values to predict the path-loss.

As another example, the base station may utilize the information on the transmission beam gain and the reception beam gain of the terminal reported from the terminal to predict the state of the uplink channel. At this time, the terminal calculates the power headroom value in a state in which the transmission beam gain and the reception beam gain of the base station are unknown, and reports the calculated power headroom value to the base station. The base station may re-interpret the power headroom information transmitted from the terminal using the information on the transmission beam gain or receiving beam gain of the terminal reported from the terminal in the capability negotiation and the information on the transmission beam gain or receiving beam gain of the base station itself. That is, the transmission beam or receiving beam gains of the base station or the terminal may be combined with the power headroom value that the specific terminal transmits, to more accurately determine whether to increase the number of resources to be allocated to the corresponding terminal (whether to increase the transmission power) or whether to reduce the number of resources to be allocated to the corresponding terminal (whether to reduce the transmission power).

However, in the beamforming system, it is necessary to perform beam management for the transmission or reception beams of the base station and the transmission or reception beams of the terminal for the efficient beam operation. Therefore, as in the second and third reasons for increasing the mismatch between the downlink channel and the uplink channel described above, the transmission/reception beam gains of the base station and the terminal may be dynamically changed according to the beam width and the beam-pair that are operated in the base station and the terminal. In such a situation, only the method for exchanging the beam gain information through the capability negotiation between the base station and the terminal may not increase the accuracy of the power headroom information. Therefore, in the beamforming system, it is necessary to transmit the power headroom information considering the beam management, which will be described below in detail.

FIG. 1 schematically illustrates a structure of a (5G, NR) communication system according to an embodiment of the present disclosure, and is an example of a configuration of an MME, an S-GW, and a 5G base station (gNB).

Referring to FIG. 1, the wireless communication system is configured to include a plurality of base stations (BSs) 105, 110, 115 and 120, a mobility management entity (MME) 125, a serving gateway (S-GW) 130. The user terminal (user equipment (UE) or a terminal 135) may access an external network through the base station and the S-GW.

Figure 2:
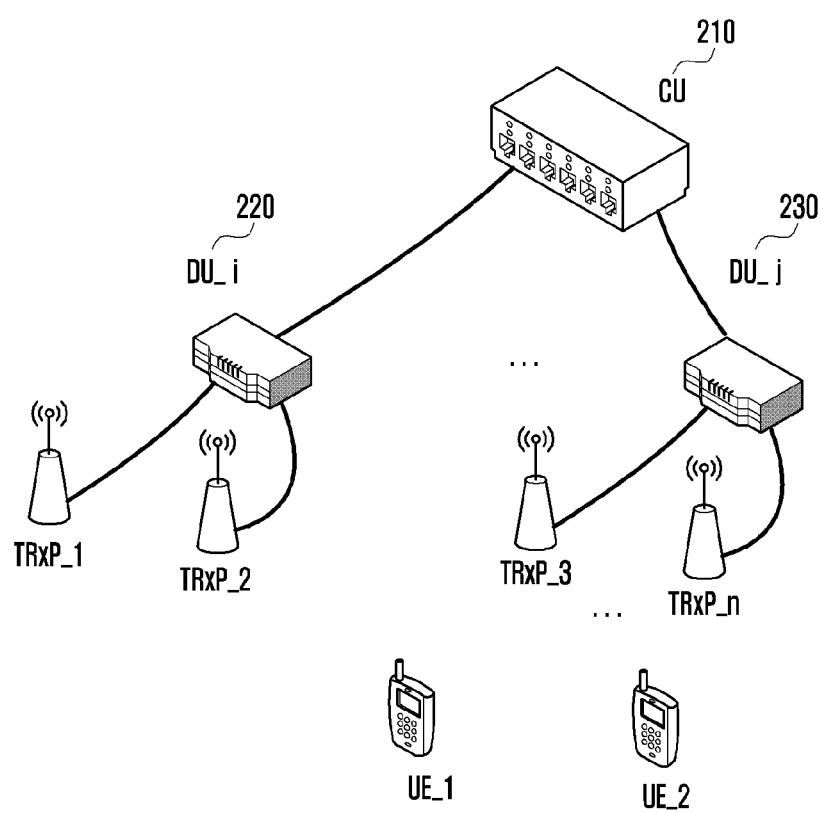
FIG. 2 schematically illustrates the structure of the (5G, NR) communication system according to the embodiment of the present disclosure, and is an example of a configuration of CU, DU, and TRxP.

FIG. 2 schematically illustrates the structure of the (5G, NR) communication system according to the embodiment of the present disclosure, and is an example of a configuration of CU, DU, and TRxP.

The central unit (CU) performs an operation of controlling a communication protocol layer above the PDCP. In the data units (DUs) 220 and 230, the DU becomes a unit of a cell in a structure in which MAC and PHR protocol layers starting from the RLC are operated, and is an example of a structure in which a plurality of transmitting and receiving points (represented by transmission and receiving point (TRxP) or TRP) within the same DU is operated.

Figure 3:
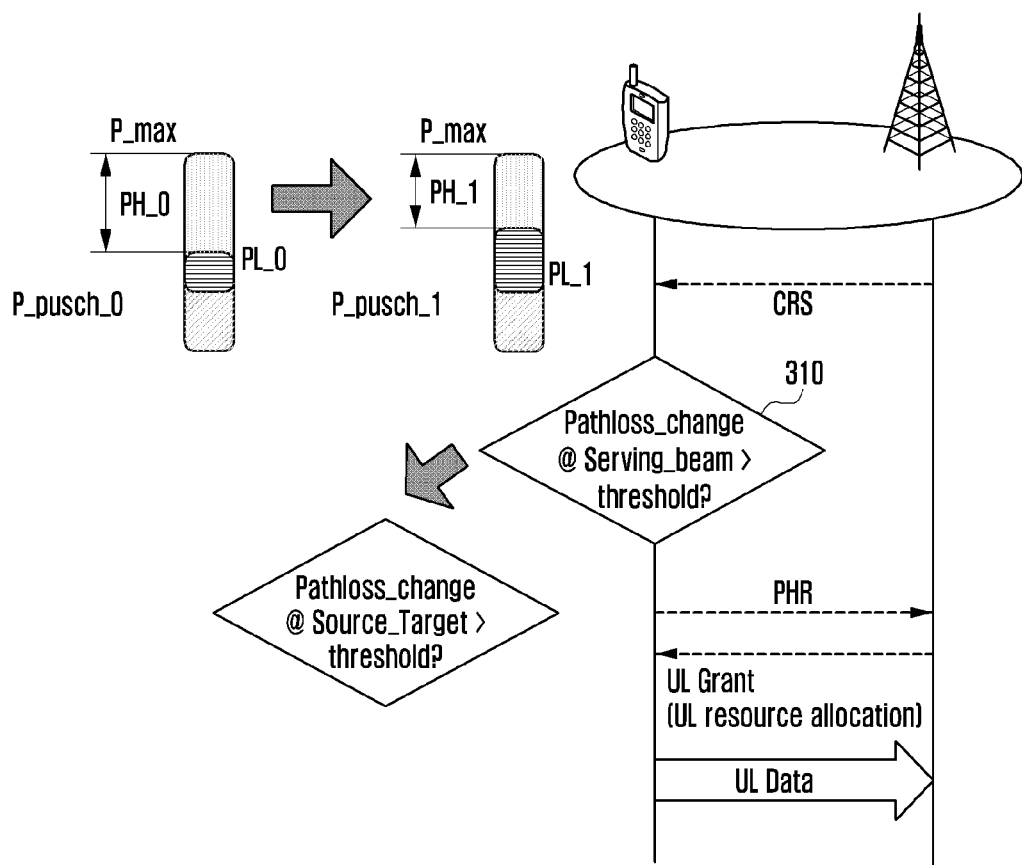
FIG. 3 illustrates an example of an operation of calculating and transmitting power headroom information for an uplink power control.

FIG. 3 illustrates an example of an operation of calculating and transmitting power headroom information for an uplink power control.

A definition and an operation for beam-based PHR are not designed for PHR transmission in the existing LTE (omni-directional). Therefore, in the beamforming transmission, when the PHR transmission operation is performed by mapping to the serving beam, there is a problem in that a delay occurs in the transmission of the PHR information according to a delay corresponding to the beam switch.

That is, when the PHR is reported according to the generation of the PHR triggering event based on the Pathloss change in the serving beam, the delay occurs. As the concrete operation example, the delay occurs in the case of determining whether to generate the PHR triggering event based on the pathloss change as a previous serving beam reference (beam 1) until the beam change is completed during the operation of changing a serving beam from a previous source beam (beam 1) to a target beam (beam 2) (301). In addition, the PHR transmission delay is additionally generated by a UL scheduling procedure for the PHR transmission after detecting the PHR triggering event. Finally, the base station can receive the PH information and then allocate UL resources for uplink data transmission based on the PH information.

Therefore, it is physically possible to perform the uplink transmission directly from the completion of the beam switch. In other words, it is possible to realize 0 ms interruption time in terms of the uplink data transmission. When the PHR is transmitted by the existing LTE operation, the delay occurs and therefore an error of a UL power control may occur due to the lack of PH information upon the transmission of the initial uplink, thereby causing the deterioration in the uplink transmission performance. In addition, the transmission delay problem occurs when the terminal starts the UL transmission by allocating the UL resource after the base station receives PH.

Since the beam change operation is performed after a certain time (beam switching timer) after the base station determines the beam switch (beam change) after the measurement report of the terminal, the path-loss change by the beam change can be predicted by the operation procedure.

Figure 4:
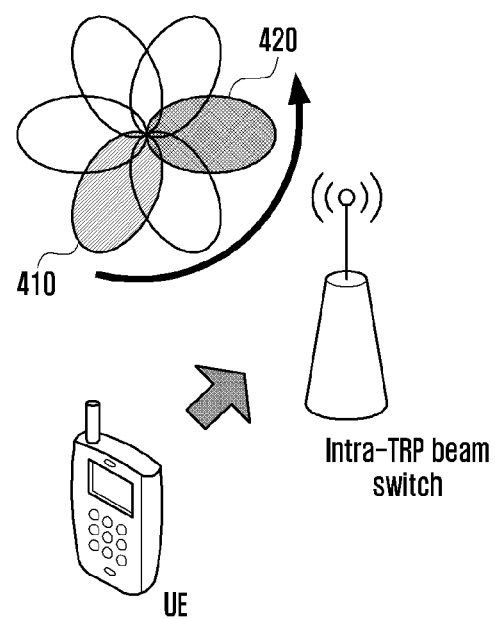
FIG. 4 illustrates an example of a change in an uplink beam.

FIG. 4 illustrates an example of the uplink beam change.

When the beam of the base station which is the uplink reception beam is changed, if the beam 410 and the target beam 420 exists within the same TRxP, since the source beam and the target beam exist within the TRxPs for the terminal and the base station, there is a high probability that the physical locations are the same and the path-loss of the source beam-pair and the path-loss of the target beam-pair are similar to each other.

Figure 5:
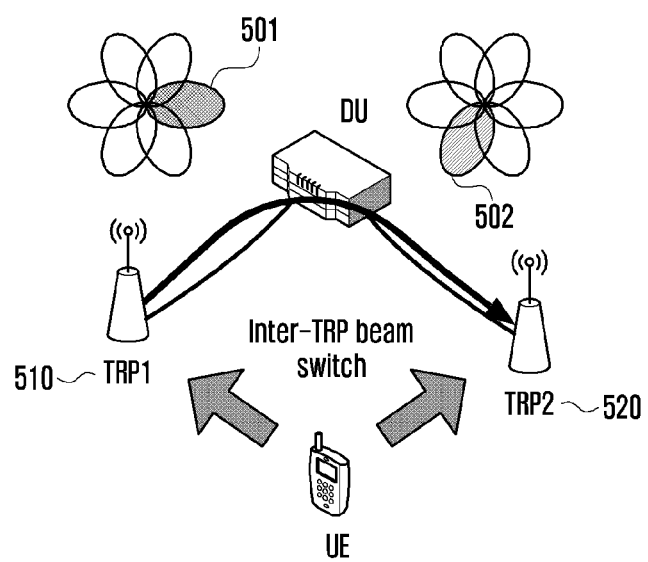
FIG. 5 illustrates an example of the change in the uplink beam.

FIG. 5 illustrates another example of the uplink beam change.

When the beam of the base station which is the uplink reception beam is changed, if the current serving beam 501 and the target beam 502 separately exist in another TRxP, since the location of the terminal is the same, but the TRxPs, which are points at which the base station (DU) actually performs the transmission and reception, are different, the physical location is different, so the Pathlosses of the source beam-pair and the target beam-pair are highly likely to be changed.

Therefore, there is a need for a design and a method for a PHR format, a PHR triggering event, and control signaling for establishing the same as a method for transmitting a new PHR for supporting new transmission environment, beamforming transmission, and a network structure TRxP configured of CU-DU-TRxP.

Figure 6:
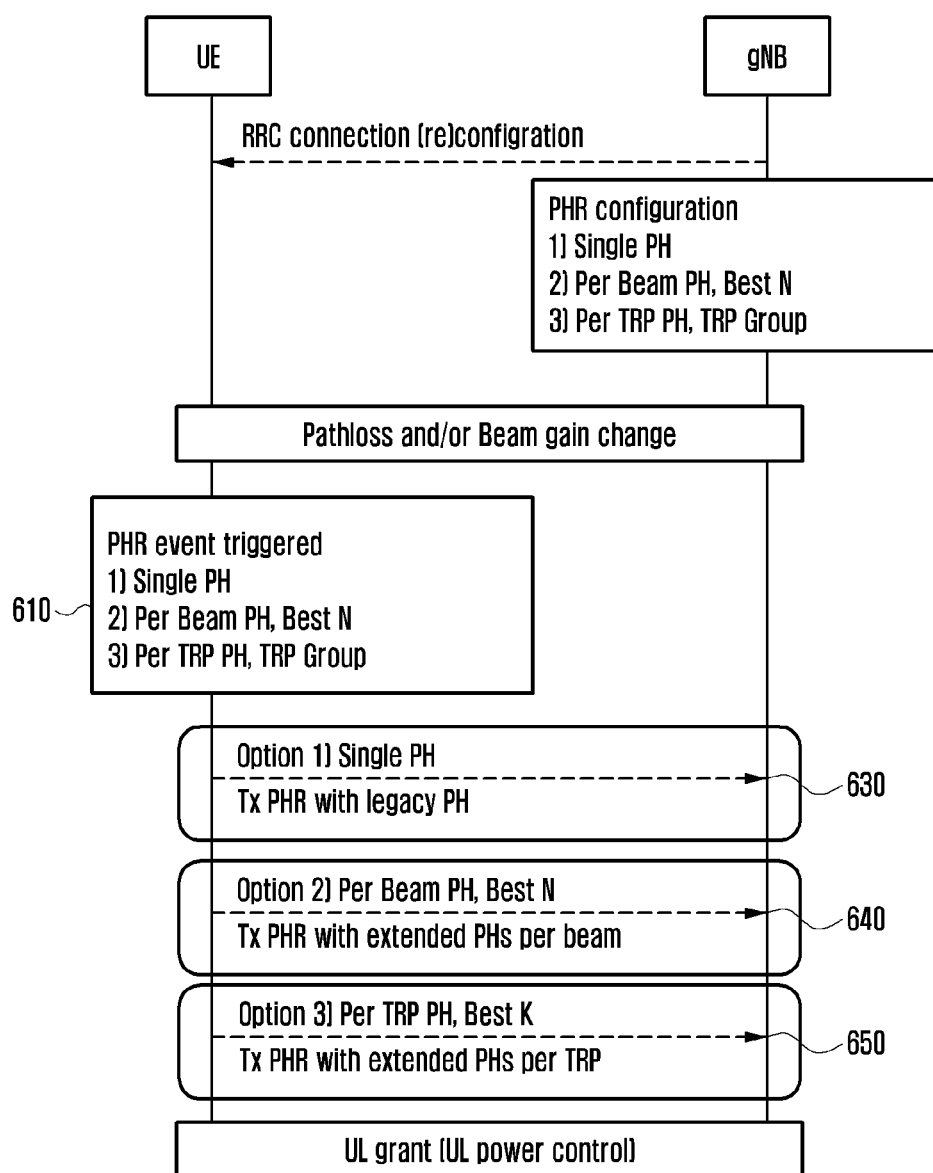
FIG. 6 illustrates an example of an operation of setting the number of PHs included in the PHR for a transmission of power headroom information.

FIG. 6 illustrates an example of an operation of setting the number of PHs included in the PHR for the transmission of the power headroom information. As the PHR transmission method, there are (1) a method for transmitting a single PH, (2) a method for transmitting a plurality of PHs per beam, and (3) a method for transmitting a plurality of PHs per TRxP.

Option 1] The single PH operation per terminal is a method for operating a single PH per RRC link between a terminal and a base station.

Option 2] A method for operating a plurality of PHs per beam includes a base station configuration, a PHR format, a terminal per beam PH calculation and transmission operation.

Option 3] A method for operating a plurality of PHs per TRP includes a base station configuration, a PHR format, a terminal per TRP PH calculation and transmission operation.

As mounting information for a PHR configuration for supporting one RRC transmission link, a situation in which additional information is required in addition to single power headroom (PH) includes the following conditions.

(1) multiple serving beam pairs in simultaneous: a situation of a network or a base station supporting a function of performing uplink transmission by simultaneously operating a plurality of serving beams.

(2) multiple UL serving beam pair across TRxP: even in a situation of the network or the base station supporting the function of performing the uplink transmission by simultaneously operating the plurality of serving beam, in particular, when the current serving beam and the target beam of the base station, which is the uplink reception beam, separately exist in another TRxP, since the location of the terminal is the same but the TRxPs, which are a point where the base station (DU) actually transmits and receives the source beam and the target beam, are different, the physical locations are different and thus the PH information of the corresponding source beam-pair and target beam-pair are highly likely to be different; or.

(3) dynamic Rx beam change from eNB for the UL transmission: when the terminal does not know the reception beam (base station reception beam) information upon the uplink transmission in the case in which the base station dynamically changes the uplink reception beam, a method for calculating PH for a plurality of candidate beams and transmitting the calculated PH is provided.

This case includes a case in which the base station performs uplink scheduling dynamically or a case where a fast uplink transmission may be performed since a supported service requires low latency performance. That is, after the terminal transmits the PH, the base station transmits the UL grant for the resource allocation of the uplink transmission and then performs the uplink data transmission. However, the terminal may know the UL receiving beam information of the base station upon the transmission of the PH to transmit the single PH. If a single PH is transmitted based only on the UL receiving beam information of the corresponding base station, there is a problem in that the base station cannot update the UL receiving beam having a better beam gain because the channel environment is changed or the UL receiving beam even when the corresponding beam gain is changed.

The method includes the case in which the serving beam and the target beam exist within the same TRxP. Unlike this, when the current beam and the target beam of the base station separately exist in another TRxP since the location of the terminal is the same, but the TRxPs, which are points at which the base station (DU) actually transmits and receives the source beam and the target beam, are different. For this reason, a method for transmitting information on PH based on a downlink transmission beam-pair and information on a plurality of PHs based on uplink transmission beam-pair to a PHR report that a terminal transmits is provided.

(4) DL/UL beam mismatch (across TRxP): there may be the case in which the current serving beam and the target beam exist within the same TRxP when the downlink transmission beam-pair and the uplink transmission beam-pair are different, but in particular, when the current serving beam and the target beam of the base station, which is the uplink reception beam, separately exists in another TRxP, since the location of the terminal is the same, but the TRxPs, which are points at which the base station (DU) actually transmits and receives the source beam and the target beam are different, a method for transmitting information on a PH based on a downlink transmission beam-pair and information on a plurality of PHs based on uplink transmission beam-pair to a PHR report that a terminal transmits is provided.

(4-1) When the base station informs the terminal of the uplink reception beam (base station reception beam) information in advance, a method for transmitting a single PH corresponding to a corresponding uplink transmission beam-pair is provided; and (4-2) When the terminal does not know the uplink reception beam (base station reception beam) information upon the uplink transmission, a method for calculating PHs for a plurality of candidate beams and transmitting the calculated PHs is provided.

The operation for setting the number of PHs included in the PHR for the transmission of the power headroom information will be described in more detail. The base station includes an operation of dividing a situation requiring the above-described additional PH information to perform the PHR configuration, that is, an operation of configuring the corresponding PHR related parameters for the operation of the plurality of PHs per next beam and the operation of the plurality of PHs per TRxP (1)(2) when the plurality of uplink beam-pairs are used for the transmission and (3)(4) when the base station dynamically changes the uplink reception beam.

Option 1] The single PH operation per terminal is a method for operating a single PH per RRC link between a terminal and a base station.

If it is determined that the base station does not include the operation of dividing a situation requiring the above-described additional PH information to perform the PHR configuration, that is, does not correspond to (1)(2) the case in which the plurality of uplink beam-pairs are used for the transmission and (3)(4) the case in which the base station dynamically changes the uplink reception beam, the operation of the single PH per terminal includes a method for operating a single PH per RRC link between the terminal and the base station.

Option 2] As a method for operating a plurality of PHs per beam, there may be the base station configuration control signaling, the PHR format, the terminal per beam PH calculation and transmission operation.

However, this beam-based PH operation and the plurality of PH transmissions can cause a control burden, and therefore, a method for operating a plurality of PHs per TRxP based on the channel similarity between beams within the same TRxP is provided.

Option 3] A method for operating a plurality of PHs per TRxP includes a base station configuration, a PHR format, a terminal per TRP PH calculation and transmission operation.

In more detail, when the base station transmits RRC (re)configuration control signaling to the terminal, the following embodiments include an operation of indicating the number of PHs included in the PHR that the terminal transmits.

Option 1) When the number of PH included in the PHR of the terminal is one, the terminal may calculate and operate the single PH based on the serving beam-pair. As a method for calculating and operating, by a terminal, a single PH, there are a method for transmitting a single PH to a PHR report and a method for selecting information on whether to transmit one PH and the corresponding PH. The embodiment of the operation may use a method for perform PHR transmission for PH information on one beam-pair received by Best RSRP.

Option 2) As a method for calculating and operating PH based on each beam-pair, there is a method for transmitting a plurality of PHs to a PHR report. A method for selecting information (PH for N beams) on how many PH is transmitted and the corresponding PH includes the following embodiment.

(2-1) N beams (method for transmitting a PHR for Best N Beam-pairs received by Best RSRP) in descending order of signal strength (for example, including RSRP and RSRQ) of beam (2-2) N beams in an ascending order of the signal strength (for example, including RSRP and RSRQ) of the beam (2-3) N beams or N_1 beams (including an operation of changing the number of PH target beams depending on the number of beams larger than the average value) equal to or greater than the average value of the signal intensity (for example, including RSRP and RSRQ) of the beam (2-4) An operation of calculating and transmitting PH values for random N beams regardless of the signal strength (for example, including RSRP and RSRQ) of the beam is provided.

Option 3) As a method for calculating and operating a PH based on each TRxP, there are a method for transmitting a plurality of PHs to a PHR report, a method for transmitting information on how many PH is transmitted, a method for selecting the corresponding PH (for example, transmission of the PHR for Best N TRxPs received by Best RSRP), and a method for informing information on Beam group corresponding to TRxP (for example, information on TRxP=1 including base station beam indexes 1, 2, 3, 4 and TRxP=2 including base station beam indexes 5, 6, 7, 8). The method for selecting and transmitting PH includes the following method.

(3-1) An operation of calculating and transmitting PH values for representative vales of each TRxP corresponding to N beams (method for transmitting a PHR for best N beam-pairs received by Best RSRP) in a descending order of the signal strength (for example, including RSRP and RSRQ) of the beam is provided (3-2) An operation of calculating and transmitting PH values for representative values of each TRxP corresponding to N beams in an ascending order of the signal strength (for example, including RSRP and RSRQ) of the beam is provided.

(3-3) An operation of calculating and transmitting PH values for representative values of each TRxP corresponding to N beams or N_1 beams (including the operation of changing the number of PH target beams depending on the number of beams larger than the average value) equal to or greater than the average value of the signal strength (for example, including RSRP and RSRQ) of the beam is provided.

(3-4) An operation of calculating and transmitting PH values for representative values of each TRxP corresponding to random N beams regardless of the signal strength (for example, including RSRP and RSRQ) of the beam is provided.

When transmitting the RRC (re)configuration control signaling to the terminal, the base station may include the information on an event for triggering the single PHR report, in which an event 620 for triggering the single PHR report includes the following embodiment.

(1) When NServing beam changes are expected.
(2) When related information is changed when calculating PH per Beam.
(3) When related information is changed when calculating PH per TRxP.

In more detail, the method for calculating and operating PH based on beam-pair among the conditions for the transmission of the power headroom information considering event-based beamforming may be variously defined as follows based on each beam reception signal.

(1) When the path-loss of at least one of the beams included in the last power headroom information that the terminal transmits to the base station is changed to a specific threshold value or more.

(2) When the path-loss for the best beam (beam having the largest signal strength of the beam) among the beams included in the last power headroom information that the terminal transmits to the base station is changed to a specific threshold value or more.

(3) When the path-loss for the worst beam (beam having the smallest signal strength of the beam) among the beams included in the last power headroom information that the terminal transmits to the base station is changed to a specific threshold value or more.

(4) When the path-loss for X or more beams among the beams included in the last power headroom information that the terminal transmits to the base station (in a descending order of the signal strength of the beam) is changed to a specific threshold value or more.

(5) When the path-loss for Y or more beams among the beams included in the last power headroom information that the terminal transmits to the base station (in an ascending order of the signal strength of the beam) is changed to a specific threshold value or more.

(6) When the path-loss of all of the beams included in the last power headroom information that the terminal transmits to the base station is changed to a specific threshold value or more.

(7) When the average value for the path-loss of the beams included in the last power headroom information that the terminal transmits to the base station is changed to a specific threshold value or more.

(8) If z ms has elapsed after the base station instructed the uplink or downlink beam to be changed (z is a timer expiration value, and the base station provides information to the terminal through the RRC configuration).

(9) When the beam ID (or beam IDs) configured by the base station for beam management and the beam ID (or beam IDs) measured by the terminal are different from each other.

(10) When the downlink beam measurement report of the terminal is configured of the uplink data channel (PUSCH) rather than the uplink control channel (PUCCH).

A method for setting a representative value based on a received signal for a beam group of TRxP in an operation based on the received signal for the beam group of the TRxP among the events for triggering the terminal PHR report includes the following embodiment.

(3-1) An operation of setting K_1 beam to be a representative value of TRxP in a descending order of the signal strength (e.g., including RSRP and RSRQ) of the beam within the beam group of the TRxP is provided.

(3-2) An operation of setting K_1 beam to be a representative value of TRxP in an ascending order of the signal strength (e.g., including RSRP and RSRQ) of the beam within the beam group of the TRxP is provided.

(3-3) An operation of setting K_1 beam to be a representative value of TRxP based on an average value of the signal strength (e.g., including RSRP and RSRQ) of the beam within the beam group of the TRxP is provided.

(3-4) An operation of setting random K_1 beam to be a representative value of TRxP regardless of the signal strength (e.g., including RSRP and RSRQ) of the beam within the beam group of the TRxP is provided.

Here, the number of K_1 can be plural or single (one).

In addition, the method for calculating and operating PH based on each TRxP based on the received signal for each TRxP beam group like Option 3) among the power headroom information transmission considering the event-based beamforming may be variously defined as follows based on the received signal for the beams of each TRxP.

(11) When the path-loss of at least one of the TRxPs included in the last power headroom information that the terminal transmits to the base station is changed to a specific threshold value or more.

(12) When the path-loss for the best TRxP (beam having the largest signal strength of the TRxP) among the TRxPs included in the last power headroom information that the terminal transmits to the base station is changed to a specific threshold value or more.

(13) When the path-loss for the worst TRxP (beam having the smallest signal strength of the beam) among the TRxPs included in the last power headroom information that the terminal transmits to the base station is changed to a specific threshold value or more.

(14) When the path-loss for X or more TRxPs among the TRxPs included in the last power headroom information that the terminal transmits to the base station (in a descending order of the signal strength of the beam) is changed to a specific threshold value or more.

(15) When the path-loss for Y or more TRxPs among the beams included in the last power headroom information that the terminal transmits to the base station (in an ascending order of the signal strength of the TRxP) is changed to a specific threshold value or more.

(16) When the path-loss of all of the TRxPs included in the last power headroom information that the terminal transmits to the base station is changed to a specific threshold value or more.

(17) When the average value for the path-loss of the TRxPs included in the last power headroom information that the terminal transmits to the base station is changed to a specific threshold value or more.

(18) If z ms has elapsed after the base station instructs the uplink or downlink beam to be changed (z is a timer expiration value, and the base station provides information to the terminal through the RRC configuration).

(19) When the beam ID (or beam IDs) configured by the base station for beam management and the TRxP ID (or TRxP IDs) measured by the terminal are different from each other.

(20) When the downlink TRxP measurement report of the terminal is configured of the uplink data channel (PUSCH) rather than the uplink control channel (PUCCH).

Also, under the above conditions, the terminal may request the transmission of the power headroom information and transmit the power headroom information as follows.

When the terminal requests the transmission of the power headroom information and the base station confirms the request or allocates the uplink resource, the terminal transmits the power headroom information.

When the terminal requests the transmission of the power headroom information and the base station instructs the power headroom information for the specific beam or the beams (or reference signal resource location, port information or the like corresponding thereto) to be transmitted, the terminal transmits the power headroom information accordingly.

Also, if the base station directly instructs the power headroom information for the specific beam or the beams (or reference signal resource location, port information or the like corresponding thereto) to be transmitted, the terminal may transmit the power headroom information accordingly.

As the method for transmitting a PHR, (1) a method (630) for transmitting a single PH, (2) a method (640) for transmitting a plurality of PHs per beam, and (3) a method (650) for transmitting a plurality of PHs per TRxP include the following operations include the follwing operation.

(1) As a method for detecting and operating, by a terminal, a corresponding PHR transmission mode, there are the following methods.

As a method for transmitting, by a base station, beam group information, information such as network architecture reflection (CU-DU-TRxP), and PHR based on PHR pre-configuration, the related configuration, of (1) the method for transmitting a single PH, (2) a method for transmitting a plurality of PHs per beam, and (3) a method for transmitting a plurality of PHs per TRxP, a PHR format, and a method for calculating and transmission a PH of modes are configured in advance and a method for applying and operating by a terminal, a PHR transmission mode based on the same is provided.

(2) As a method for detecting and operating, by a base station, a corresponding PHR transmission mode, there are the following methods.

As a method for transmitting, by a base station, information on PHR pre-configuration based (beam group information) network architecture reflection (CU-DU-TRxP) or the like and a PHR at the time of changing information as needed, the related configuration of (1) the method for transmitting a single PH, (2) the method for transmitting a plurality of PHs per beam, and 3) the method for transmitting a plurality of PHs per TRxP, the PHR format, and the method for calculating and transmission a PH of mode are configured and updated by the RRC (re)configuration and a method for applying and operating by a terminal, a PHR transmission mode based on the same is provided.

(2-1) A method in which a base station transmits whether to change TRxP to a terminal by a TRxP change indication based on (e.g., best N) beam measurement reports that the terminal feeds back or explicitly transmits a network initiated PHR request; and a method in which a terminal receiving the same transmits a PHR are provided.

(2-2) As another method, the operation of transmitting, by a terminal, a PHR on which information on a plurality of PHs is included (per beam or TRxP), and selecting, by a base station, the information on the PHs to reflect the information on the PHs on a power control for a transmission of uplink data is provided.

Also, (1) As a method for adding a serving beam(s) change event, a method defined as the following Table 1 is provided. That is, a standard document may have contents as shown in Table 1. However, the following contents are only exemplary embodiments, and the method of adding the serving beam change event can be defined in various ways.

As an advantage of the PHR triggering when the serving beam(s) index is changed, it is possible to quickly trigger the PH by changing the serving beam. However, as the uplink transmission for the PHR transmission by the terminal increases, the control burden and power consumption for the PHR transmission increase (whenever the serving beam change, PHR is triggered; frequent PHRs and unnecessary control overhead.)

TABLE 1

NR specification

A Power Headroom Report (PHR) shall be triggered if any of the following events occur:
prohibit PHR-Timer expires or has expired, and the path loss has changed more than dl-PathlossChange dB for at least one activated Serving Cell of any MAC entity which is used as a pathloss reference since the last transmission of a PHR in this MAC entity when the MAC entity has UL resources for new transmission;
Change of the Serving Beam(s)
When the MAC entity has UL resources for new transmission, and the following is true in this TTI for any of the change of Serving Beam(s) of any MAC entity with configured uplink:

(2) In addition, a method for setting a separate short prohibit timer applied for changing a serving beam is provided. Make new the prohibit timer shorter or zero when the serving beam is changed.

As an operation method for prohibitPHR-Timer_beam configuration, in addition to the setting of legacy prohibit-PHR-Timer value, a method for separately setting prohibit-PHR-Timer_beam to be applied at the time of changing serving beam as the following Table 2 is provided.

TABLE 2

NR specification

A Power Headroom Report (PHR) shall be triggered if any of the following events occur:
prohibit PHR-Timer expires or has expired and the path loss has changed more than dl-PathlossChange dB for at least one activated Serving Cell of any MAC entity which is used as a pathloss reference since the last transmission of a PHR in this MAC entity when the MAC entity has UL resources for new transmission;
Change of the Serving Beam(s)
prohibitPHR-Timer_beam expires or has expired, and the path loss has changed more than dl-PathlossChange dB for at least one activated Serving Cell of any MAC entity which is used as a pathloss reference since the last transmission 3) As another method, a prohibit timer exception operation and an operation of newly setting a path-loss threshold when suddenly changing a beam gain and a path-loss are provided. (Make new path loss threshold to ignore prohibit timer for bblockage (NLOS) or beam change)

As an operation method of dl-Pathloss_Change beam configuration, in addition to setting of a legacy dl-Pathloss-Change value, a method for separately configuring dl-Pathloss_Change beam performing the prohibit timer exception operation at the time of transmitting beamforming and an operation of triggering a PHR event based on the setting if a path-loss is changed above dl-Pathloss_Change beam within the prohibit timer are provided.

An example of setting new parameters for the new PHR triggering event and the related configuration is as the following Table 3.

TABLE 3

PHR triggering event and configuration

Periodic_timer {sf10, sf20, sf50,sf100, sf200, sf500, sf1000, infinity}
ProhibitPHR_timer {sf0, sf10, sf20, sf50, sf100, sf200, sf500, sf1000}
ProhibitPHR_timer_beam {sf0, sf10, sf20, sf50, sf100, sf200, sf500, sf1000}
dl-Pathlosschange {dB1, dB3, dB6, infinity}
dl-Pathlosschange_beam{dB1, dB3, dB6, adB9, dB12, dB15, dB18, dB30, infinity}

FIGS. 7 to 12 illustrate an example of an operation of newly introducing a PHR triggering event related to a beam change and reducing a delay in transmitting the corresponding PHR. The concrete contents will be described below.

Since beam mutuality is maintained between the downlink beam-pair and the uplink 1 beam-pair, the base station may measure the uplink beam of the terminal and apply the measured uplink beam to the downlink beam management. The downlink beam management instruction of the base station may be made periodically or non-periodically. When the base station periodically instructs the beam management, the base station may provide information on a reference signal (RS) transmission for the measurement of the uplink beam to the terminal in order to measure the uplink beam that the terminal transmits. For example, the base station may inform the terminal of a time resource (e.g., slot or subframe index, symbol index within a slot or a subframe, or the like) and a frequency resource (e.g., a bandwidth for a sounding reference signal (SRS) transmission) for the sounding reference signal (SRS) transmission for the measurement of the uplink beam of the terminal.

When instructing the beam management periodically, the base station may inform the terminal of the time-frequency resources for the SRS transmission through the RRC. The terminal receiving the time-frequency resources forms different uplink beams by the number of beams that the base station instructs and transmits the uplink SRS. Meanwhile, the base station may instruct the terminal to non-periodically perform the downlink beam management. In this case, the base station may use a specific field within downlink DCI (downlink control information) or uplink DCI to trigger the beam management instruction. That is, specific X bits in the DCI may inform the terminal that the RS (e.g., SRS) for the measurement of the uplink beam may be transmitted based on the current subframe (subframe in which the downlink DCI is transmitted) or after K subframe based on the current subframe. At this time, the base station informs the terminal of the number of RS symbols used for the measurement of the uplink beam, the symbol position where the RS is transmitted (e.g., the last symbol of the slot or the subframe or the last second symbol), or two information by the DCI. Such information may be related to how many uplink beams the terminal may use to perform the uplink transmissions.

For example, the downlink beam management information that the base station transmits to the terminal may include information on how many beams the terminal forms and transmits. For example, assume that the base station may measure four uplink beams and therefore instructs four different uplink beams to be transmitted. In this case, the terminal may transmit the RS for the measurement of four uplink beams by different CP-OFDM symbols or DFT-S-OFDM symbols (i.e., transmission through the RS for the measurement of four uplink beams). As another example, if different beams are frequency-divided (frequency division multiplexing (FDM)) in the same CP-OFDM (or DFT-S-OFDM) symbol and can be transmitted, less than four CP-OFDM (or DFT-S-OFDM) symbols may be used to transmit the RS for the measurement of the uplink beam.

The base station may transmit information on how many uplink beams are to be transmitted to the terminal through UE-specific RRC, MAC CE, group common DCI, or UE-specific DCI. For example, if the base station instructs the transmission of N uplink beams, the terminal transmits the N uplink beams. The base station receiving the uplink beams from the terminal may determine the downlink beam (since beam mutuality exists between the uplink beam-pair and the downlink beam-pair).

The base station may inform the terminal of the information on the downlink beam through the MAC control element (CE), the UE-specific DCI, or the group common DCI. At this time, information on one or two or more beam IDs (or resource indexes on which beams are transmitted) may be included. The base station informing the information may transmit the downlink data and the control information, which are transmitted to the corresponding terminal, through the informed beam. At this time, a previously promised rule is required between the base station and the terminal. For example, the base station may transmit the downlink data and the control information, which are transmitted just after informing the terminal of the downlink beam, through the informed beam.

As another example, the base station-terminal may apply the informed beam based on a timer. That is, the base station drives the timer after informing the terminal of the downlink beam, and the terminal drives the timer after receiving the downlink beam information from the base station. Before the timer expires, the terminal may form a beam in the direction of the beam that the base station informs or may switch the beam in the direction of the beam that the base station informs to prepare for receiving the downlink. Such a timer-based operation uses a large subcarrier spacing, so that the problem in that the base station and the terminal may quickly form or change the beam in a mmWave system in which a symbol length is short and a length of the subframe (or slot) is short can be solved.

The base station determining the uplink beam may inform the terminal of the information on the uplink beam through the MAC control element (CE), the UE-specific DCI, or the group common DCI. At this time, the information on which beam the uplink transmission may be performed through may be included (i.e., ID information of a beam (or index of the resource to which the beam is transmitted) may be included). At this time, if one beam ID is included, the terminal performs the uplink transmission to the corresponding beam. If at least two beam IDs are included, the terminal performs the uplink transmission to the corresponding beams. For the operation, a previously promised rule is required between the base station and the terminal. For example, the terminal may transmit the uplink data and the control information, which are transmitted just after receiving the information on the uplink beam from the base station, through the corresponding beam (or corresponding beams).

As another example, the base station-terminal may apply the beam based on the timer. That is, the base station drives the timer after transmitting the uplink beam information to the terminal, and the terminal drives the timer after receiving the uplink beam information from the base station. The terminal may switch in the direction of the beam (or beams) that the base station instructs before the timer expires to prepare for the uplink transmission. Such a timer-based operation uses a large subcarrier spacing, so that the problem in that the base station and the terminal may quickly form or change the beam in a mmWave system in which a symbol length is short and a length of the subframe (or slot) is short can be solved.

Figure 7:
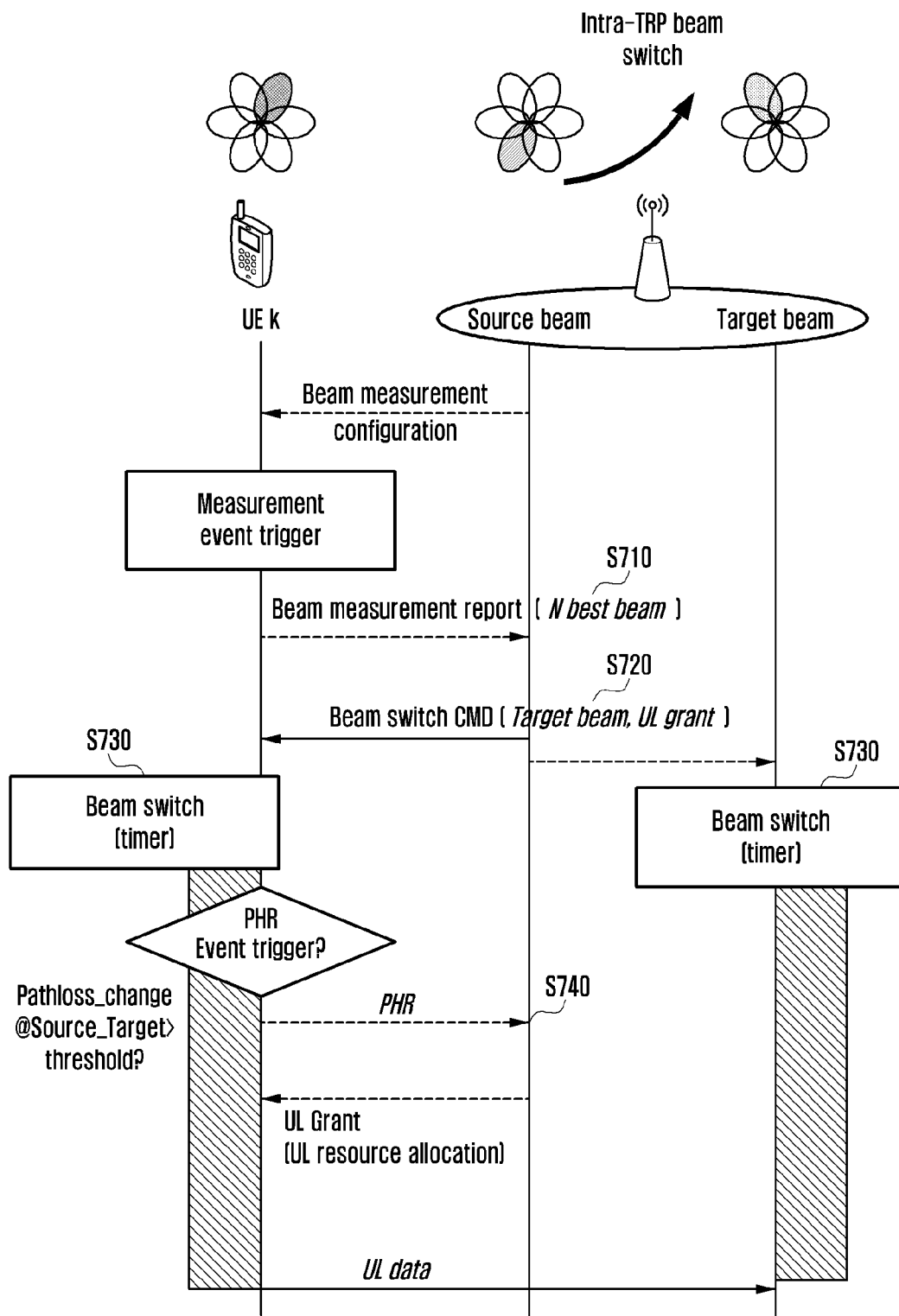
FIG. 7 illustrates an example of an operation of newly introducing a PHR triggering event when a beam for the transmission of the power headroom information is changed and reducing a delay when the corresponding PHR is transmitted (when an intra-TRxP beam is changed).
Figure 8:
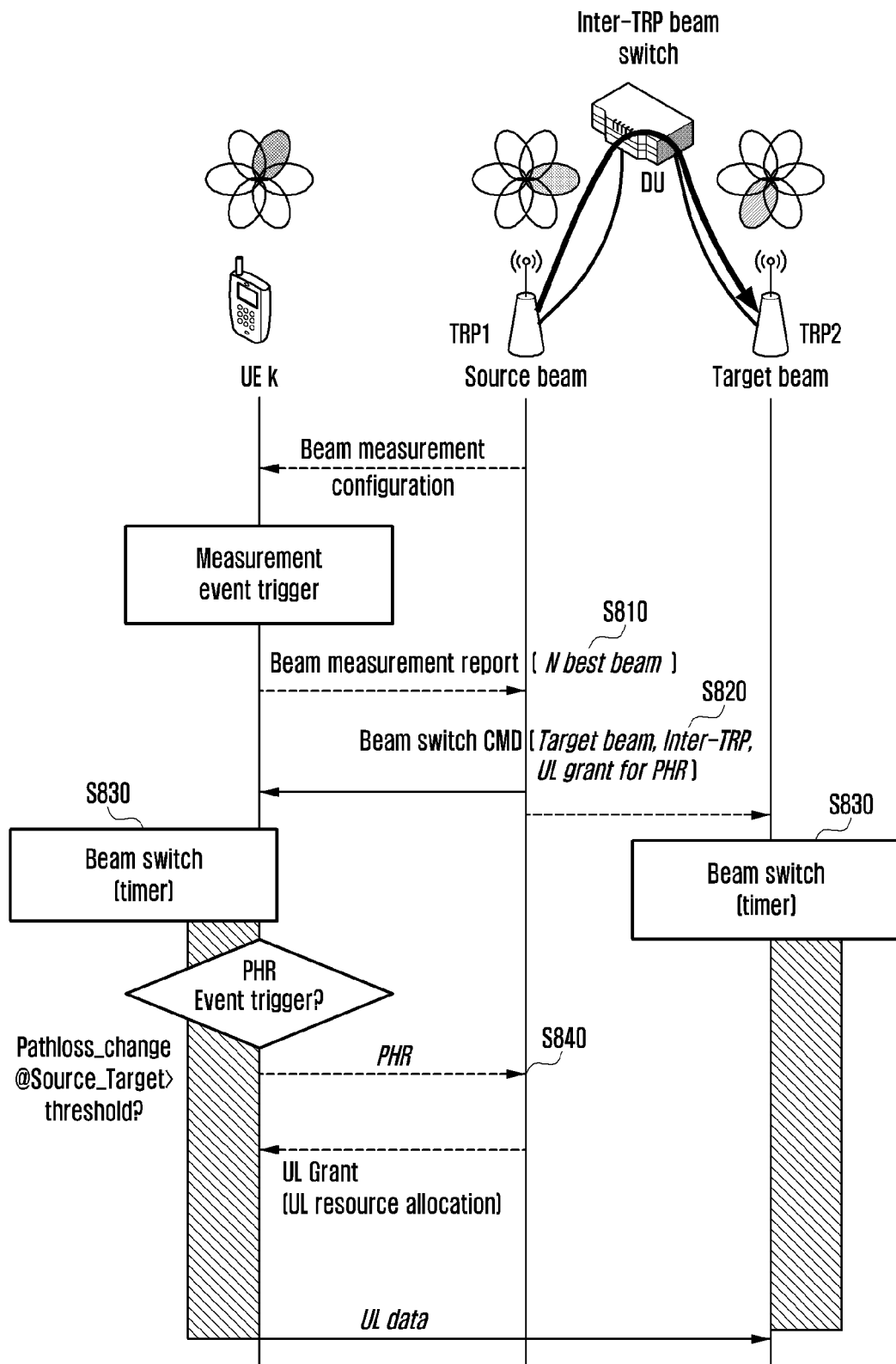
FIG. 8 illustrates an example of an operation of newly introducing a PHR triggering event when a beam for the transmission of the power headroom information is changed and reducing a delay when the corresponding PHR is transmitted (when an inter-TRxP beam is changed).

FIGS. 7 and 8 illustrate an example of an operation of newly introducing a PHR triggering event when a serving beam is changed and reducing a delay at the time of transmitting the corresponding PHR.

FIGS. 7 and 8 illustrate an example in which a UL grant for a PHR transmission is previously included in a beam switch procedure when a beam is changed and an example of performing whether to determine the PHR triggering at the time of the operation of the beam switch timer.

FIG. 7 illustrates an example of an operation of newly introducing a PHR triggering event at the time of changing a serving beam for the transmission of the power headroom information is changed and reducing a delay when the corresponding PHR is transmitted. In FIG. 7, an example of uplink beam management in case of Intra-TRxP beam change (that is, case of changing the source beam and the target beam within the same TRP) is shown.

The terminal may perform the beam measurement report according to the beam measurement setting and the measurement event trigger (S710). When the beam needs to be changed according to the beam measurement report, the base station may transmit the beam change command message to the terminal (S720) and may include the information on the target beam and the UL grant for the PHR transmission in the message.

Therefore, the terminal and the base station may change the beam (S730), and when the PHR is triggered, the terminal and the base station may report the PHR using the UL grant (S740). As described above, the terminal may reduce the transmission delay using the received UL grant without transmitting the separate SR to transmit the PHR. The contents of the PHR event trigger conditions and the method for reporting PHR are the same as described, which will be omitted hereinafter.

FIG. 8 illustrates an example of an operation of newly introducing a PHR triggering event when the beam for the transmission of the power headroom information is changed and reducing a delay when the corresponding PHR is transmitted. FIG. 8 illustrates an example of the uplink beam management in the case of changing the Inter-TRxP beam (that is, case of changing from the source beam to the target beam of another TRP).

Unlike the Intra-TRxP beam change, in the case of the Inter-TRxP beam change, an operation of including information (inter-TRxP beam switch indicator) indicating whether to change an inter-TRxP beam on a beam switch command that the base station transmits to the terminal and transmitting the information is provided. At this time, in the case of the Intra-TRxP beam change, an operation of transmitting by setting Inter-TRxP beam switch indicator=0, and in case of the Inter-TRxP beam change, an operation of transmitting by setting Inter-TRxP beam switch indicator=1 may be provided. Alternatively, only the case of changing the inter-TRxP beam, the indicator may also be provided.

The reason of including the inter-TRxP beam switch indicator is to correct the PH according to the TRP change. That is, if the TRPs of the source beam and the target beam are different, the base station corrects the PH determined based on the source beam to be suited for the target beam or the terminal may perform the correction. However, even when the information is not included, the base station may determine whether to change the beam between the target TRPs to correct the PH.

In addition, steps S810 to 840 are the same as steps S710 to S740, which will be omitted hereinafter.

FIGS. 9 to 12 illustrate an example of an operation of newly introducing a PHR triggering event when a serving beam is changed and reducing a delay at the time of transmitting the corresponding PHR, and illustrate an example of an operation of previously performing whether to determine PHR triggering when a beam is changed, including and transmitting a UL grant for a PHR transmission in a beam switch procedure, and transmitting a PHR after a beam switch timer.

Figure 9:
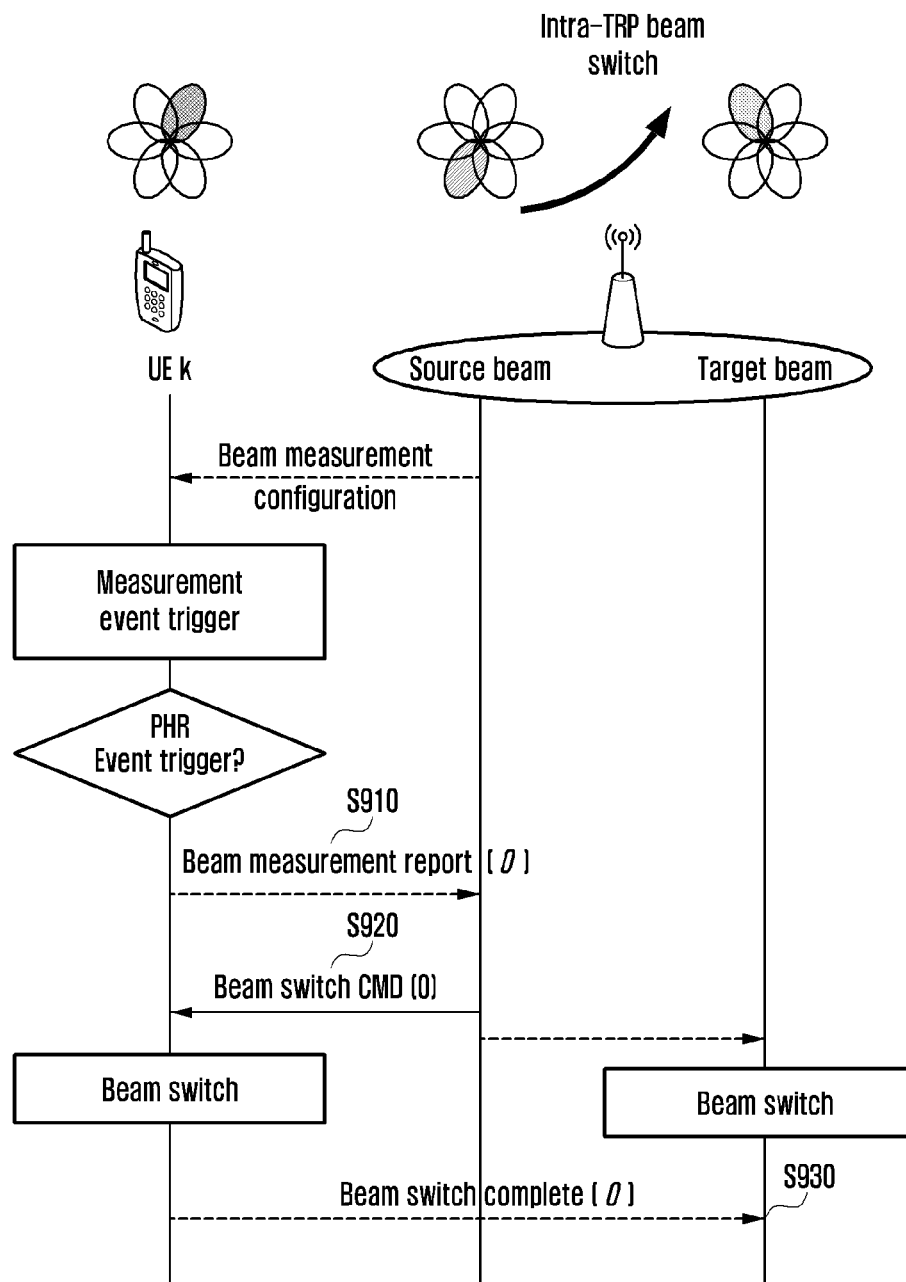
FIG. 9 illustrates an example of an operation of transmitting power headroom information when a beam switch operation is performed (an operation of transmitting the existing beam switch message when a PHR event is not triggered).

FIG. 9 illustrates an example of an operation of transmitting power headroom information when a beam switch operation is performed.

FIG. 9 illustrates an example of an operation of transmitting the existing beam switch message when the PHR event is not triggered.

The PHR-related information may not be included in the control message transmitted/received at the beam switch operation or may be included as NULL.

In detail, the terminal may perform the beam measurement report according to the beam measurement setting and the measurement event trigger (S910). When the beam needs to be changed according to the beam measurement report, the base station may transmit the beam change command message to the terminal (S920) and the terminal and the base station may change the beam. Further, the terminal may a beam change complete message to the base station (S930).

At this time, if the PHR event is not triggered, the PHR related information may not be included in the beam measurement report, the beam change command, and the beam change complete message and may be included as the NULL.

Figure 10:
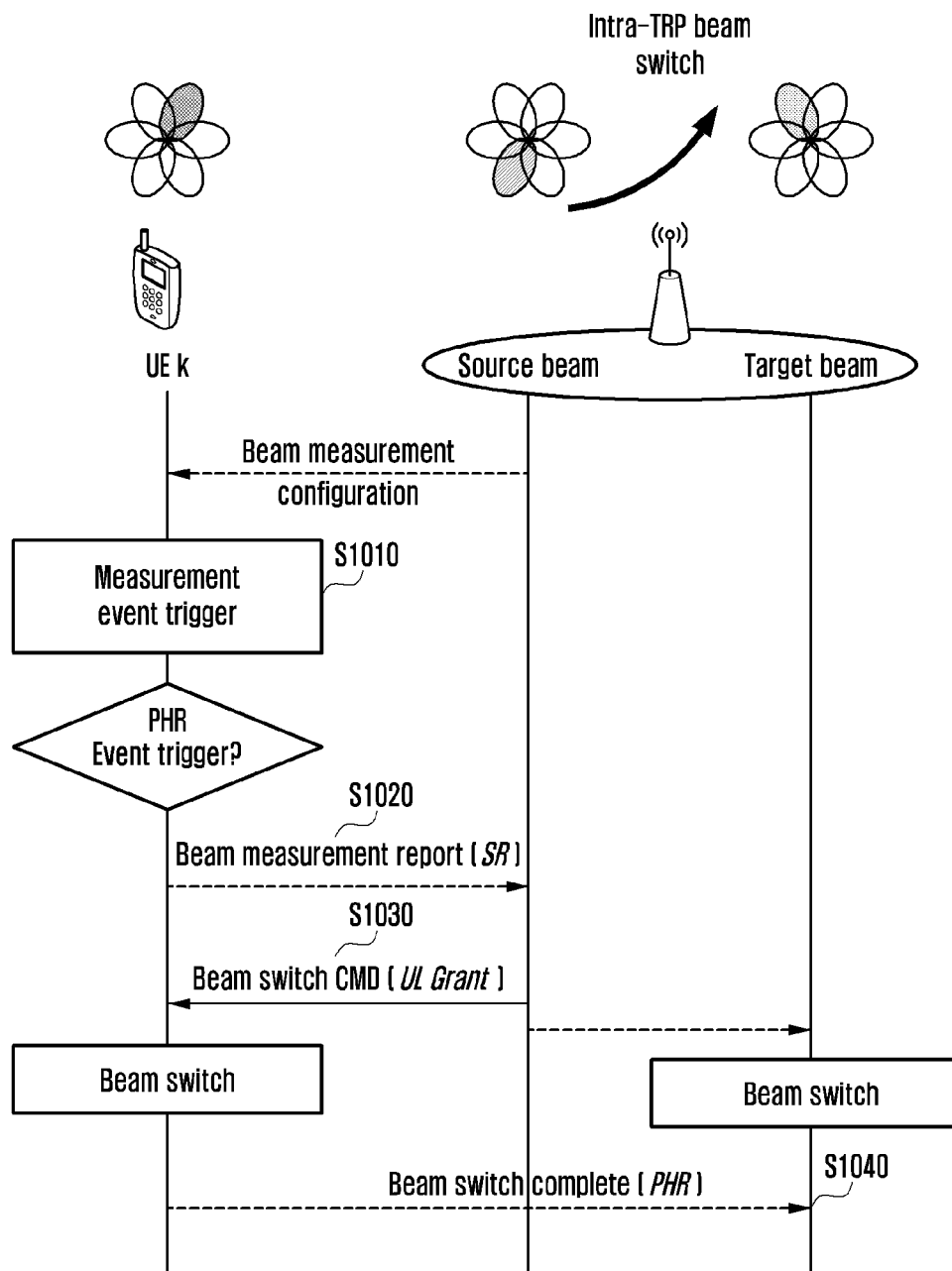
FIG. 10 illustrates an example of an operation of transmitting power headroom information when the beam switch operation is performed (operation of adding PH related information to the existing beam switch message and transmitting the same when the PHR event between the Intra-TRxPs is triggered).

FIG. 10 illustrates an example of an operation for transmitting the power headroom information in the beam switch operation.

In FIG. 10, when a PHR event between Intra-TRxPs is triggered, an operation of adding PH related information to the existing beam switch message and transmitting the same will be described by way of example. That is, since the source beam and the target beam is the same base station (DU), an operation of performing a PHR during the beam switch operation to reduce a PH transmission delay is performed.

A detailed example of the operation includes an operation in which (1) when the terminal performs beam measurement report by the serving beam (S1010), (2) the terminal transmits PHR SR along with the beam measurement report based on the PHR trigger condition (S1020), (3) a base station (source beam) transmits a UL grant to a terminal at the time of the beam switch command (CMD) transmission (S1030), (4) the terminal transmits a PHR when the terminal transmits a beam switch confirm request by the target beam (S1040).

Figure 11:
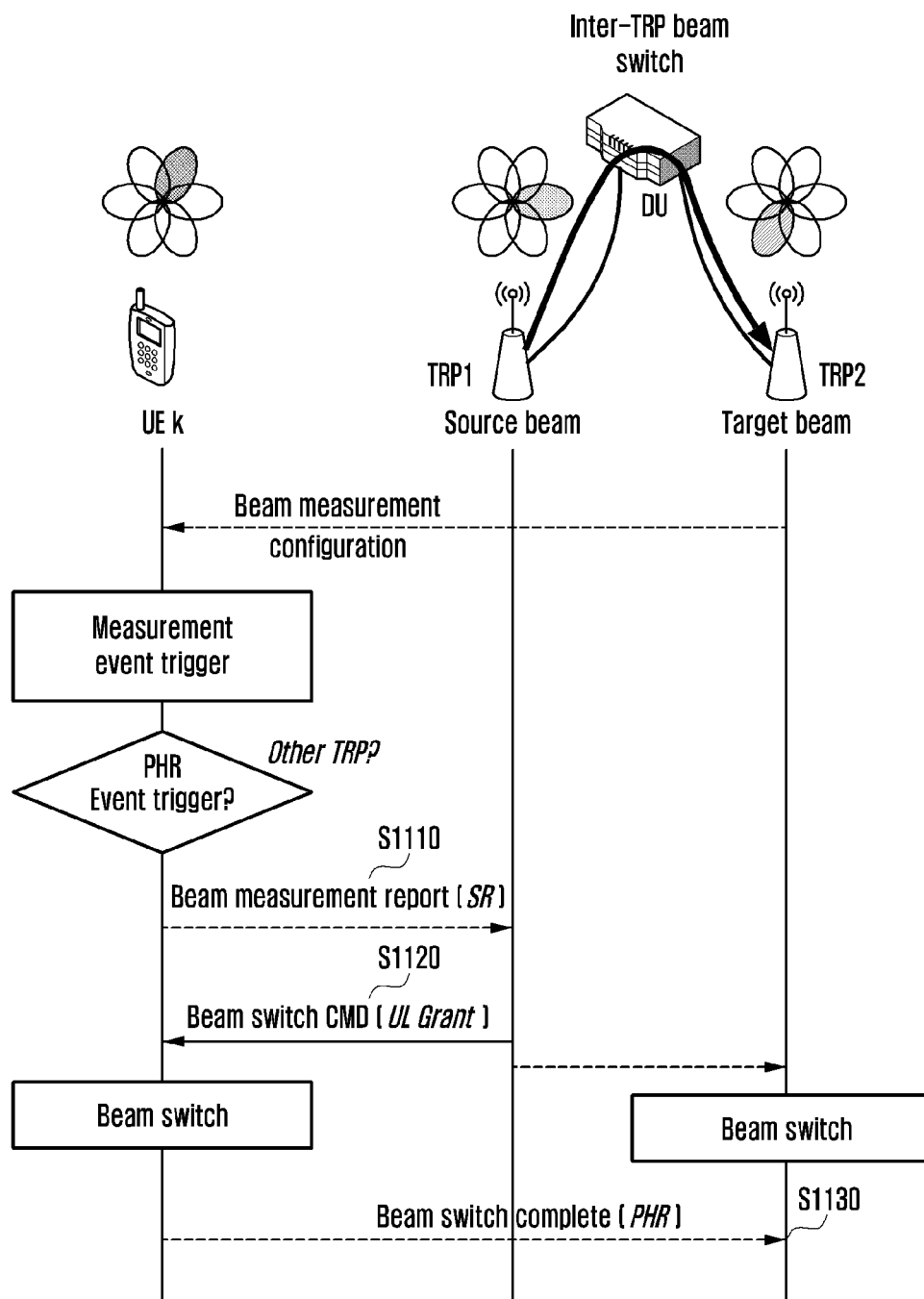
FIG. 11 illustrates an example of an operation of transmitting power headroom information when the beam switch operation is performed (operation of adding PH related information to the existing beam switch message and transmitting the same when the PHR event between the inter-TRxPs is triggered in the terminal).

FIG. 11 illustrates an example of an operation for transmitting the power headroom information in the beam switch operation.

FIG. 11 illustrates an example of an operation of adding and transmitting the PH related information to the existing beam switch message when the terminal triggers the Inter-TRxP PHR event.

At the time of generating the inter-TRP beam switch, Case 1) when the terminal determines whether the inter-TRP is changed (when the base station previously informs the terminal of the beam group information of the TRxP, for example, when the base station broadcasts the system information or informs the corresponding terminal of the beam group information of the TRxP through the RRC (re)configuration), the Pathloss is changed, and therefore the terminal defines the generation of the beam switch as new PHR triggering.

Therefore, the terminal triggers the PHR event and reports the triggered PHR event to the base station.

A detailed example of the operation is an operation in which (1) when the terminal performs beam measurement report by the serving beam (S1110), (2) the terminal transmits PHR SR along with the beam measurement report based on the PHR trigger condition (S110), (3) a base station (source beam) transmits a UL grant to a terminal at the time of the beam switch CMD transmission (S1120) (4) the terminal transmits a PHR when the terminal transmits a beam switch confirm request by the target beam (S1130).

Figure 12:
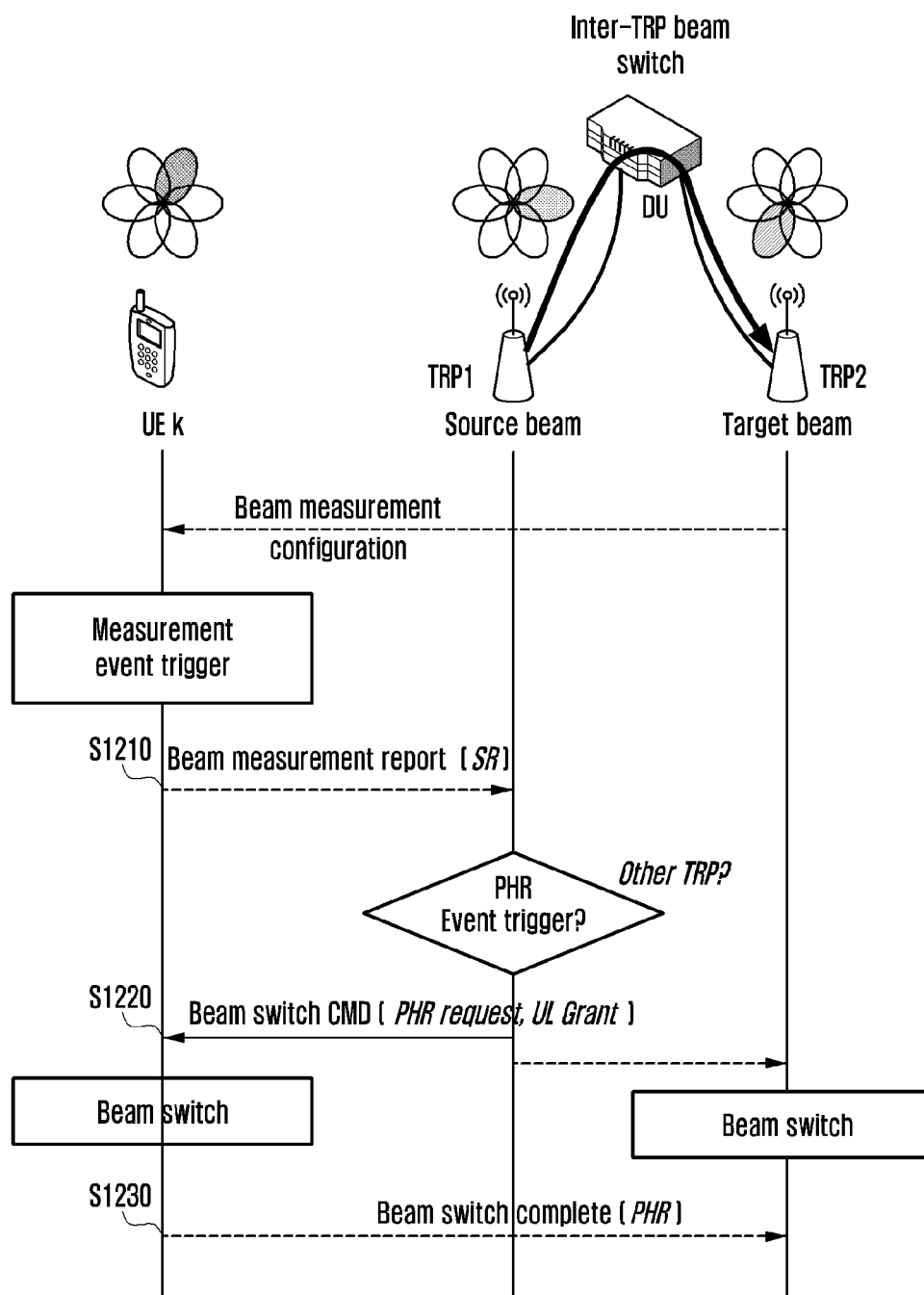
FIG. 12 illustrates an example of an operation of transmitting power headroom information when the beam switch operation is performed (operation of adding PH related information to the existing beam switch message and transmitting the same when the PHR event between the inter-TRxPs is triggered in the base station).

FIG. 12 illustrates an example of an operation for transmitting the power headroom information in the beam switch operation.

In FIG. 12, when the base station triggers the inter-TRxP PHR event, an operation of adding PH related information to the existing beam switch message and transmitting the same is provided.

A detailed example of the operation includes an operation in which (1) when the terminal performs beam measurement report by the serving beam (S1210), (2) the terminal transmits PHR SR along with the beam measurement report based on the PHR trigger condition (S1210), (3) a base station (source beam) transmits a UL grant to a terminal at the time of the beam switch CMD transmission (S1220), (4) the terminal transmits a PHR when the terminal transmits a beam switch confirm by the target beam (S1230).

Figure 13:
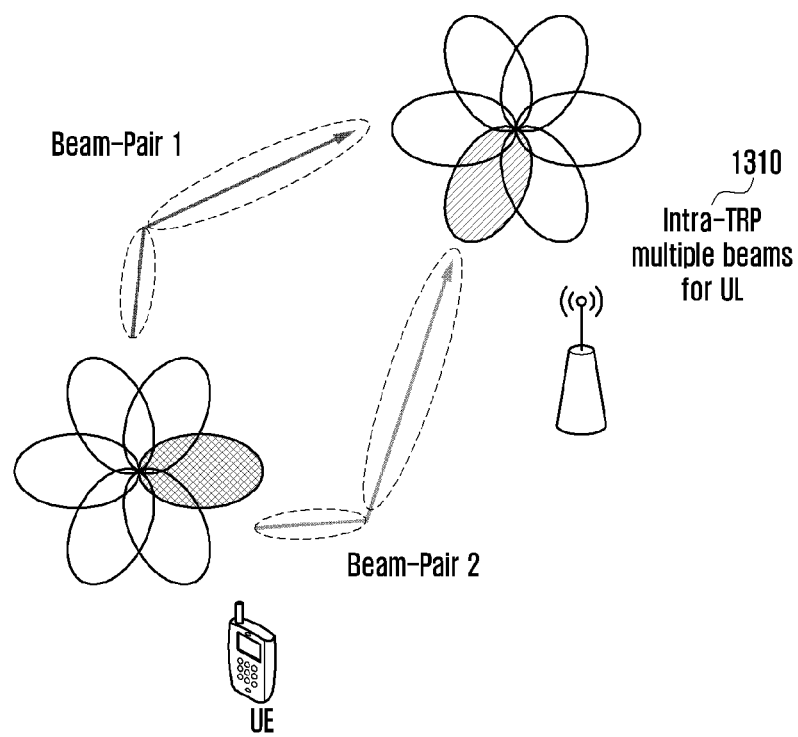
FIG. 13 illustrates an example of transmitting UL data through a plurality of uplink beam-pairs (when a plurality of beams of the base station, which is an uplink reception beam, exists within the same TRxP).

FIG. 13 illustrates an example of transmitting UL data through a plurality of uplink beam-pairs. In FIG. 13, an embodiment of the case in which the plurality of beams of the base station that are the uplink reception beams exist within the same TRxP (1310) will be described.

There may be the situation of the network or the base station which supports a function of simultaneously operating the plurality of serving beams to perform the uplink transmission, the case in which the beam of the base station, which is the uplink reception beam, exists within the same TRxP between the current serving beam and the target beam, but in particular, in the case in which the current serving beam and the target beam of the base station, which are the UL reception beam, exist separately in another TRxP (FIG. 14), since the location of the terminal is the same, but the TRxPs, which are points at which the base station (DU) actually transmits and receives the source beam and the target beam, are different, the PHR report that the terminal transmits may include the PH information based on the downlink transmission beam-pair and a plurality of PH information based on the uplink transmission beam-pair.

Figure 14:
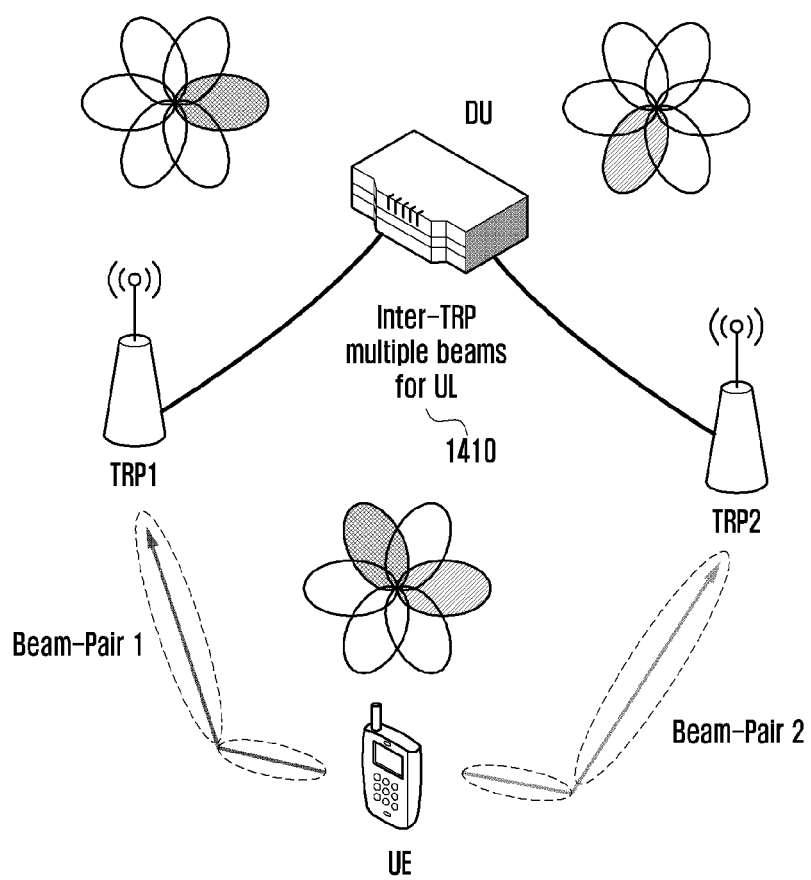
FIG. 14 illustrates an example of transmitting the UL data through the plurality of uplink beam-pairs (when the plurality of beams of the base station, which is the uplink reception beam, separately exists within another TRxP).

FIG. 14 illustrates an example of transmitting UL data through a plurality of uplink beam-pairs. In FIG. 14, an embodiment of the case in which the plurality of beams of the base station that are the uplink reception beams, separately exist within another TRxP (1410) will be described.

Even in the network or the base station which supports the function of performing the uplink transmission by simultaneously operating the plurality of serving beam, in particular, when the current serving beam and the target beam of the base station, which is the uplink reception beam, separately exist in another TRxP, since the location of the terminal is the same but the TRxPs, which are a point where the base station (DU) actually transmits and receives the source beam and the target beam, are different, the physical locations are different and thus the PH information of the corresponding source beam-pair and target beam-pair are highly likely to be different, the plurality of PH information is required.

Figure 15:
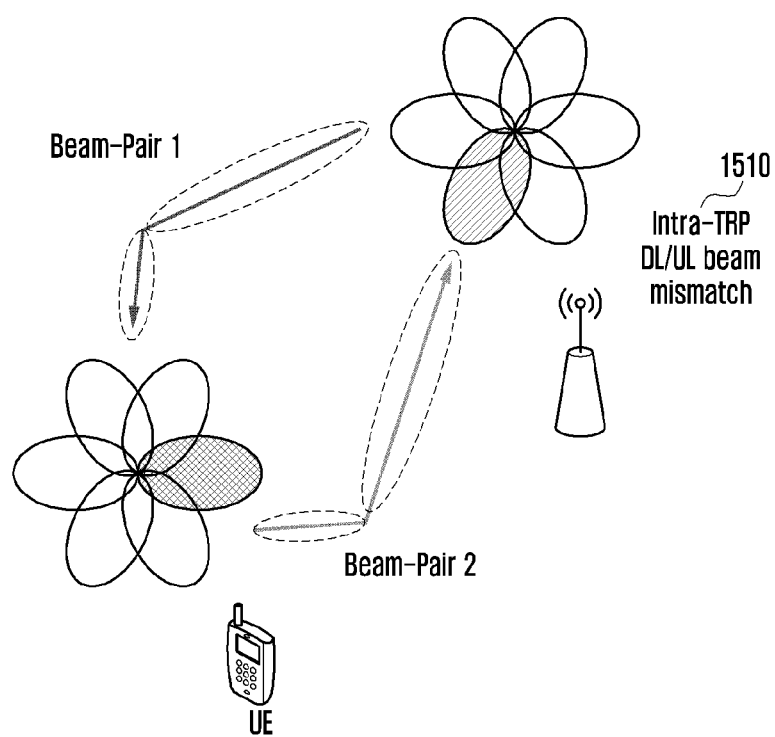
FIG. 15 illustrates an example of transmitting the UL data when the beam-pair of the downlink and the beam-pair of the uplink are different (when the beam of the base station which is the downlink transmission beam and the beam of the base station which is the uplink reception beam exist within the same TRxP).

FIG. 15 illustrates an example of transmitting UL data when the downlink and uplink beam-pairs are different. FIG. 15 illustrates an embodiment of the case in which the base station beam that is the downlink transmission beam and the base station beam that is the uplink reception beam exist within the same TRxP (1510).

The terminal does not know the reception beam (base station reception beam) information of the base station upon the uplink transmission in the case in which the base station dynamically changes the uplink reception beam, the terminal may calculate PH for a plurality of candidate beams and transmit the calculated PH.

Figure 16:
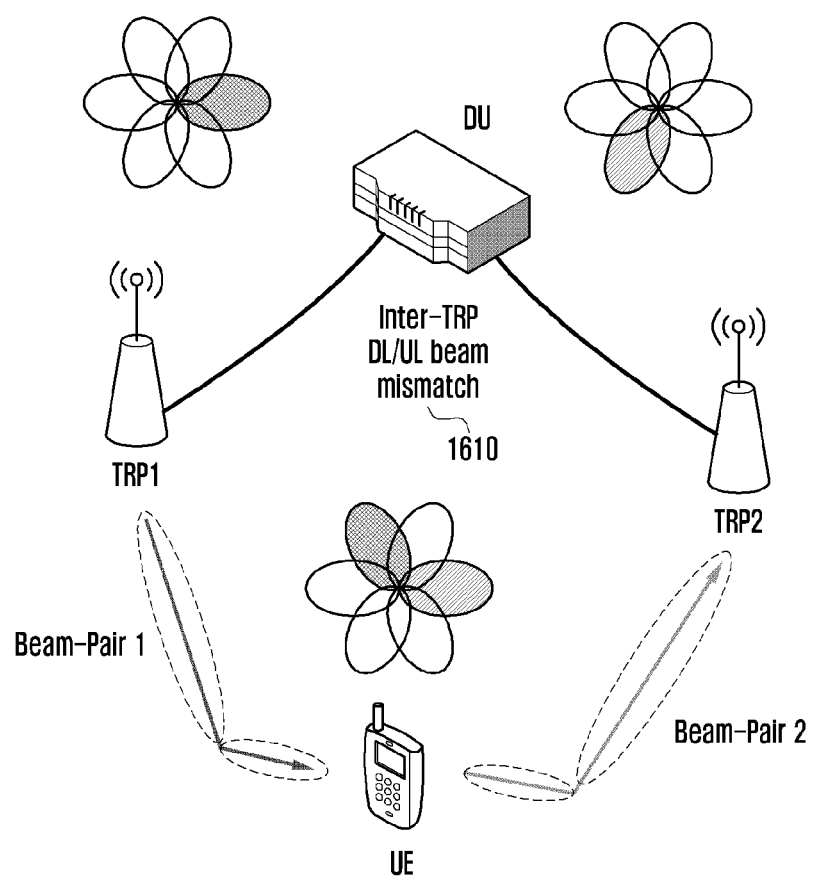
FIG. 16 illustrates an example of transmitting the UL data when the beam-pair of the downlink and the beam-pair of the uplink are different (when the beam of the base station which is the downlink transmission beam and the beam of the base station which is the uplink reception beam separately exist within another TRxP).

FIG. 16 illustrates an example of transmitting UL data when the downlink and uplink beam-pairs are different. FIG. 16 illustrates an embodiment of the case in which the base station beam that is the downlink transmission beam and the base station beam that is the uplink reception beam, separately exist within another TRxP (1610).

When the downlink transmission beam-pair and the uplink transmission beam-pair are different, the case in which the current serving beam and the target beam exist within the same TRxP, but in particular, when the current serving beam and the target beam separately exist within another TRxP, the location of the terminal is the same, but the TRxPs, which are points at which the base station (DU) actually transmits and receives the source beam and the target beam are different. Therefore, the information on a PH based on a downlink transmission beam-pair and information on a plurality of PHs based on uplink transmission beam-pair to a PHR report that a terminal transmits may be provided.

Alternatively, when the base station informs the terminal of the reception beam (base station reception beam) information in advance upon the transmission of the uplink, the terminal may transmit a single PH corresponding to a corresponding uplink transmission beam-pair is provided; and Alternatively, when the terminal does not know the reception beam (base station reception beam) information upon the uplink transmission, a method for calculating PHs for a plurality of candidate beams and transmitting the calculated PHs is provided.

Figure 17:
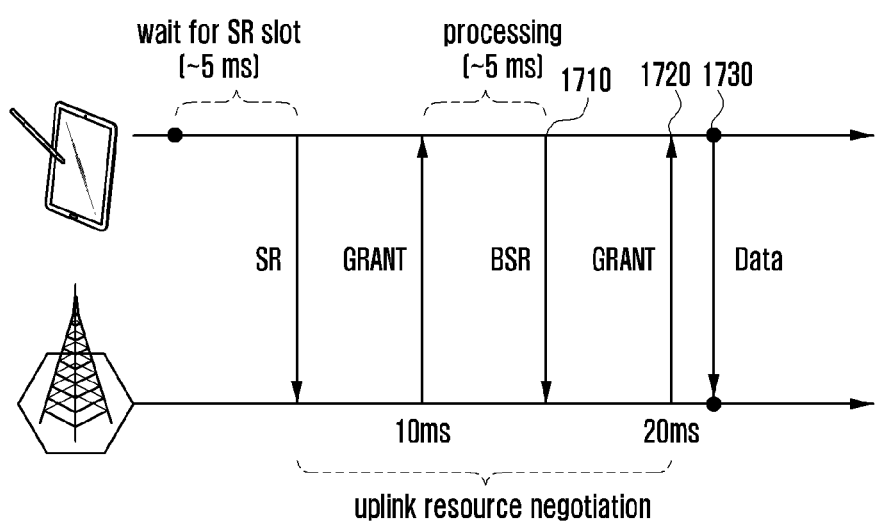
FIG. 17 illustrates an example of an operation of performing an uplink resource allocation by transmitting, by the terminal, information on SR, BSR, and PHR to the base station and receiving an UL grant from the base station in the LTE for the uplink resource allocation, and an example of a required time delay.

FIG. 17 illustrates an example of an operation of performing an uplink resource allocation by transmitting, by the terminal, information on SR, BSR, and PHR to the base station and receiving an UL grant from the base station, in the LTE for the uplink resource allocation, and an example of a required time delay.

The delay may occur in a case in which the base station performs uplink scheduling dynamically or a case where a fast uplink transmission may be performed since a supported service requires low latency performance.

That is, after the terminal transmits the BSR (1710), the base station transmits the UL grant (1720) for the resource allocation of the uplink transmission and then performs the uplink data transmission (1730). At this time, the terminal may know the UL reception beam information of the base station upon the transmission of the PH to transmit the single PH. If a single PH is transmitted based only on the UL reception beam information of the corresponding base station, there is a problem in that the base station cannot update the UL reception beam having a better beam gain because the channel environment is changed or the UL reception beam even when the corresponding beam gain is changed.

Figure 18:
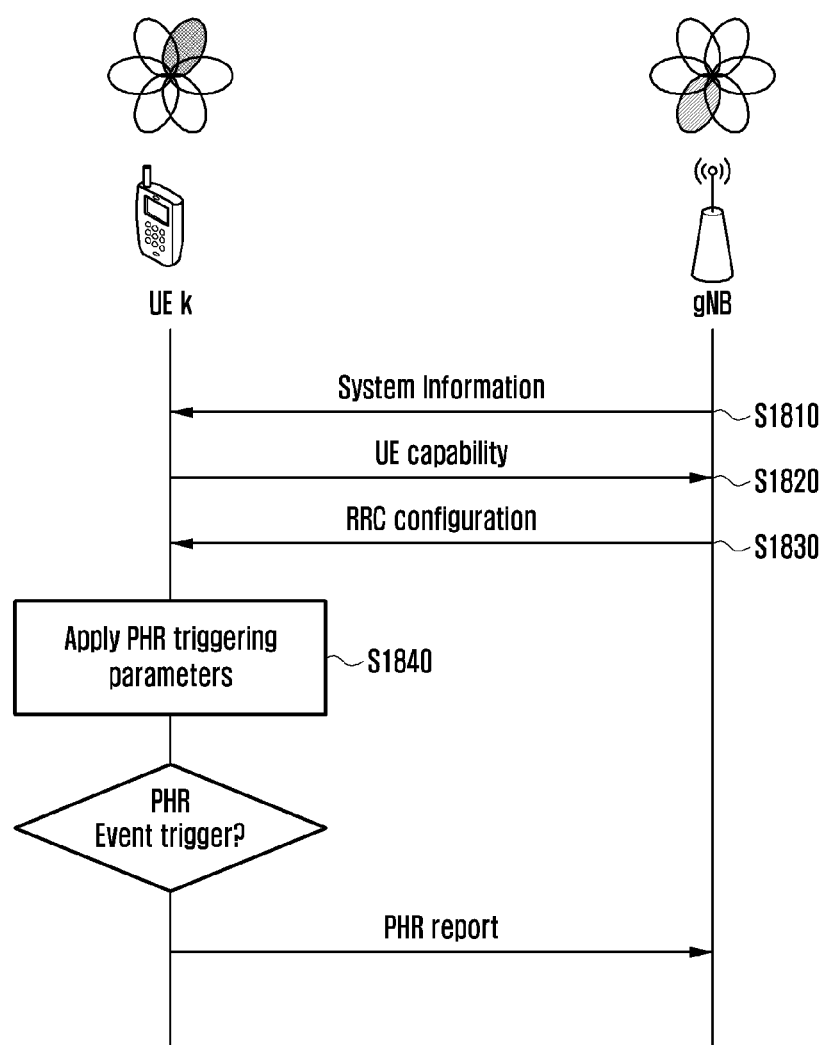
FIG. 18 illustrates an example of an operation of configuring a PHR Triggering event related to a beam width change for the transmission of the power headroom information considering beamforming.

FIG. 18 illustrates an example of an operation of configuring a PHR triggering event related to a beam width change for the transmission of the power headroom information considering beamforming.

An example of an operation in the case in which different beam widths per synchronization signals (PSS, SSS), a control channel (control), and a data transmission channel in a network supporting beamforming transmission are used will be described. For example, the example of the case in which the synchronization signal uses a very wide beam, the control channel uses a wide beam, and the data channel uses a narrow beam will be described.

The terminal may understand the synchronization signals (PSS and SSS) and the beamforming transmission beam width of the control channel (control) and the data transmission channel. The terminal may identify the beamforming transmission beam width of the synchronization signals (PSS, SSS), the control channel (control), and the data transmission channel through the negotiation (SI and UE capability or RRC (re)configuration) between the terminal and the base station (S1810, S1820, S1830). The terminal may identify a PHR parameter set as the following Table 4 as an example based on the SI received from the base station, UE capability or RRC (re)configuration.

TABLE 4

| Beam width | Periodic_timer | ProhibitPHR_timer | Beam change | dl-PathlossChange |
|---|---|---|---|---|
| Omnidirectional (1) | ○ | Normal | X | ○ |
| Very wide beam (29) | ○ | Shorter | ○ | ○○ |

TABLE 4-continued

| Beam width | Periodic_timer | ProhibitPHR_timer | Beam change | dl-PathlossChange |
|---|---|---|---|---|
| Wide beam (58) | ○ | Very shorter | More frequently ○ | ○○○ |
| narrow beam (112) | ○ | Approximately zero | Very frequently ○ | ○○○○ |

In Table 4, Applicable: O, Non-applicable: X

The operation of the above Table 4 indicates an operation of applying Periodic timer, and setting ProhibitPHR_timer to be zero or a very small value and setting dl-Pathloss-Change value to be a large value since the beam change is frequently generated, for example, when the data channel uses a narrow beam "(when transmission beam is narrow as 360/112)."

FIG. 19 illustrates an example of the MAC CE format for the transmission of the power headroom information considering beamforming.

FIG. 19 illustrates an example of applying PH per beam. An example of applying PH per beam is a method for transmitting additional information (1910, 1920, 1930) on beam in addition to the existing 6-bit PH value. At this time, the information on the beam may be configured as an explicit beam index and may be configured implicitly.

FIG. 20 illustrates another example of the MAC CE format for the transmission of the power headroom information considering beamforming. FIG. 20 illustrates an example of applying PH per TRxP.

Referring to FIG. 20, indexes 2010, 2020, and 2030 of TRxP may be additionally included in the MAC CE. At this time, the information on the TRxP may be configured as an explicit beam index or may be configured implicitly.

Meanwhile, in the conventional LTE system, a dual connectivity based PHR triggering event is defined. When at least one path-loss is changed above a threshold value in the case in which one terminal transmits an uplink data for a macro cell (MeNB) and an uplink for a small cell (SeNB) on a plurality of transmission links, a method for calculating, by a terminal, PH values for both of the uplink for the macro cell (MeNB) and the uplink for the small cell (SeNB) and transmitting the calculated PH values to the uplink for the macro cell (MeNB) and the uplink for the small cell (SeNB), respectively, is provided.

The present disclosure includes a method for performing an operation of triggering PHR and transmitting a PHR as an operation including the following option based on whether the uplink transmission of the terminal that performing beamforming is operated in a high frequency band (HF Higher Frequency).

When an RF circuit and a power amplifier operate independently to separately operate each maximum UL transmission power (Pc_max_MeNB, Pc_max_SeNB) on two uplinks, the base station may transmit the corresponding information to a terminal as system information (SI) and RRC (re)configuration. The terminal selects one of an option of (1) transmitting all PHRs when at least one of two uplink path-losses is changed above a threshold value or an option of (2) transmitting all PHRs when at least one of two uplink path-losses is changed above a threshold value from the pre-configured PHR events based on the transmitted system information (SI) and RRC (re)configuration and may trigger and transmit the PHR.

Alternatively, the base station may select one of PHR trigger event options of (1) transmitting all PHRs when at least one of two uplink path-losses is changed above a threshold value or (2) transmitting all PHRs when at least one of two uplink path-losses is changed above a threshold value from PHR events and configure the information in the terminal as system information (SI) and RRC (re)configuration is provided.

(1) In case of legacy DC LF+LF (low frequency: sub 6 GHz).

When at least one path-loss is changed above a threshold value in the case in which one terminal performs an uplink transmission for a macro cell (MeNB) and an uplink for a small cell (SeNB) on a plurality of transmission links, the terminal may calculate PH values for both of an uplink for a macro cell (MeNB) and an uplink for a small cell (SeNB) and transmit the calculated PH values to the uplink for the macro cell (MeNB) and the uplink for the small cell (SeNB), respectively, is provided.

(2) In case of EN-DC (LTE-NR DC) LF+HF (high frequency: i.e., 28 GHz).

(2-1) Application of independent PHR event: The PHR event of the HF is not reported to an LF base station.

When one terminal transmits performs an uplink transmission for a macro cell (MeNB) and an uplink for a small cell (SeNB) on a plurality of transmission links, a case in which one frequency band of two uplinks is included in a low frequency sub 6 GHz and the remaining uplink is included in a high frequency: i.e., 28 GHz is assumed.

When each of the maximum UL transmission power (Pc_max_meNB, Pc_max_seNB) is separated and operated on two uplinks by operating the RF circuit and the power amplifier independently, even when the path-loss of each link is changed more than the threshold value, the terminal may transmit a PHR only to the corresponding link.

In this case, the base station assumes the case in which one frequency band of two uplinks is included in a low frequency sub 6 GHz and the remaining uplink is included in a high frequency: i.e., 28 GHz.

When an RF circuit and a power amplifier operate independently to separately operate each maximum UL transmission power (Pc_max_MeNB, Pc_max_SeNB) on two uplinks, the base station may transmit the corresponding information to a terminal as system information (SI) and RRC (re)configuration. The terminal may select one of an option of (1) transmitting all PHRs when at least one of two uplink path-losses is changed above a threshold value or an option of (2) transmitting all PHRs when at least one of two uplink path-losses is changed above a threshold value from PHR events that the base station previously configures based on the transmitted system information (SI) and RRC (re) configuration and may trigger and transmit the selected PHR.

Alternatively, the base station may select one of PHR trigger event options of (1) transmitting all PHRs when at least one of two uplink path-losses is changed above a threshold value or (2) transmitting all PHRs when at least one of two uplink path-losses is changed above a threshold value from PHR events and configure the information in the terminal as system information (SI) and RRC (re)configuration.

(2-2) When at least one path-loss is changed above a threshold value in the case in which one terminal performs an uplink transmission for a macro cell (MeNB) and an uplink for a small cell (SeNB) on a plurality of transmission links, the terminal may calculate PH values for both of an uplink for a macro cell (MeNB) and an uplink for a small cell (SeNB) and transmit the calculated PH values to the uplink for the macro cell (MeNB) and the uplink for the small cell (SeNB), respectively.

(3) In case of NR STA: HF+HF.

(3-1) When at least one path-loss is changed above a threshold value in the case in which one terminal may perform an uplink transmission for a macro cell (MeNB) and an uplink for a small cell (SeNB) on a plurality of transmission links, the terminal may calculate PH values for both of an uplink for a macro cell (MeNB) and an uplink for a small cell (SeNB) and transmit the calculated PH values to the uplink for the macro cell (MeNB) and the uplink for the small cell (SeNB), respectively.

(3-2) Application of independent PHR event: The PHR event of the HF is not reported to an LF base station.

When one terminal performs an uplink transmission for a macro cell (MeNB) and an uplink for a small cell (SeNB) on a plurality of transmission links, it is assumed that one frequency band of two uplinks is included in a low frequency sub 6 GHz and the remaining uplink is included in a high frequency: i.e., 28 GHz.

When each of the maximum UL transmission power (Pc_max_meNB, Pc_max_seNB) is separated and operated on two uplinks by operating the RF circuit and the power amplifier independently, even when the path-loss of each link is changed more than the threshold value, the terminal may transmit a PHR only to the corresponding link is provided.

In this case, it is assumed that one frequency band of two uplinks is included in a low frequency sub 6 GHz and the remaining uplink is included in a high frequency: i.e., 28 GHz.

When an RF circuit and a power amplifier operate independently to separately operate each maximum UL transmission power (Pc_max_MeNB, Pc_max_SeNB) on two uplinks, the base station may transmit the corresponding information to a terminal as system information (SI) and RRC (re)configuration. The terminal selects one of an option of (1) transmitting all PHRs when at least one of two uplink path-losses is changed above a threshold value or an option of (2) transmitting all PHRs when at least one of two uplink path-losses is changed above a threshold value from the pre-configured PHR events based on the transmitted system information (SI) and RRC (re)configuration and may trigger and transmit the PHR.

Alternatively, the base station may select one of PHR trigger event options of (1) transmitting all PHRs when at least one of two uplink path-losses is changed above a threshold value or (2) transmitting all PHRs when at least one of two uplink path-losses is changed above a threshold value from PHR events and configure the information in the terminal as system information (SI) and RRC (re)configuration.

Meanwhile, in the conventional LTE system, discrete Fourier transform-spread-orthogonal frequency division multiplexing (DFT-S-OFDM) is used as an uplink waveform. In contrast, in the 5G communication system, both the DFT-S-OFDM and cyclic prefix-orthogonal frequency division multiplexing (CP-OFDM) can be used as a waveform in order to maximize the flexibility of the system operation. Since different waveforms have different characteristics, it is necessary to construct power headroom information considering this point.

For example, the DFT-S-OFDM has a lower peak-to-average power ratio (PAPR) than that of the CP-OFDM. Therefore, in order to support the high PAPR of the CP-OFDM, a power amplifier (PA) having a wide linear region is required, which can increase the price of the terminal. Therefore, in order to support different waveforms using the same PA in the same terminal, back-off of the transmission power may be performed in order to reduce the amount of signals out of a linear region of PA due to high PAPR when the CP-OFDM may be used. In this case, the fact that the terminal performs the back-off using the CP-OFDM may be included in the power headroom information. More specifically, bit informing whether or not the terminal performs back-off may be included in the corresponding power headroom information. If the back-off is performed, the bit may be set to be "1." Also, if the terminal has performed the back-off of the transmission power due to the use of the CP-OFDM, the $P_{CMAX}$ specified in the above Equations 3a, 3b, and 3c may be changed to $\overline{P}_{CMAX}$. At this time, $\overline{P}_{CMAX} = P_{CMAX} - \Delta$ and $\Delta$ is a back-off value that the terminal performs.

FIG. 23 illustrates an example of a change operation of the DFT-S-OFDM or the CP-OFDM which is a UL waveform. More specifically, a control signaling operation for a dynamic uplink waveform change indication is provided.

Unlike the conventional LTE using only the DFT-S-OFDM for the uplink (UL) transmission, the (5G) NR is operated using both of the DFT-S-OFDM and the CP-OFDM. Each UL waveform has advantages and disadvantages as follows. The CP-OFDM exhibits improved hash spectrum efficiency performance, and the DFT-S-OFDM exhibits lower PAPR performance and thus requires a relatively small power back-off value.

Therefore, there is a need to change the DFT-S-OFDM or the CP-OFDM, which is the UL waveform, by a sudden signal drop or the like which occurs due to required reliability (link budget) and a blockage during the beamforming transmission process for a coverage extension of a cell.

More specifically, it is advantageous to select the DFT-S-OFDM for the coverage extension of the cell. When the required reliability (link budget) level is high, for example, it is advantageous to select DFT-S-OFDM in a situation of supporting traffic which is a service type such as URLLC. Also, it is advantageous to select DFT-S-OFDM when the sudden signal drop or the like which occurs due to the blockage occurs during the beamforming transmission process. On the other hand, it is advantageous to select the CP-OFDM in a relatively close cell region (terminal location or cell size).

It is an example of the change operation of the DFT-S-OFDM or the CP-OFDM which is a UL waveform. More specifically, the control signaling operation for a dynamic uplink waveform change indication is provided.

FIG. 21 shows a method for a dynamic uplink waveform change indication in the PHY layer for a control signaling operation for the dynamic uplink waveform change indication in the first embodiment.

Figure 21A:
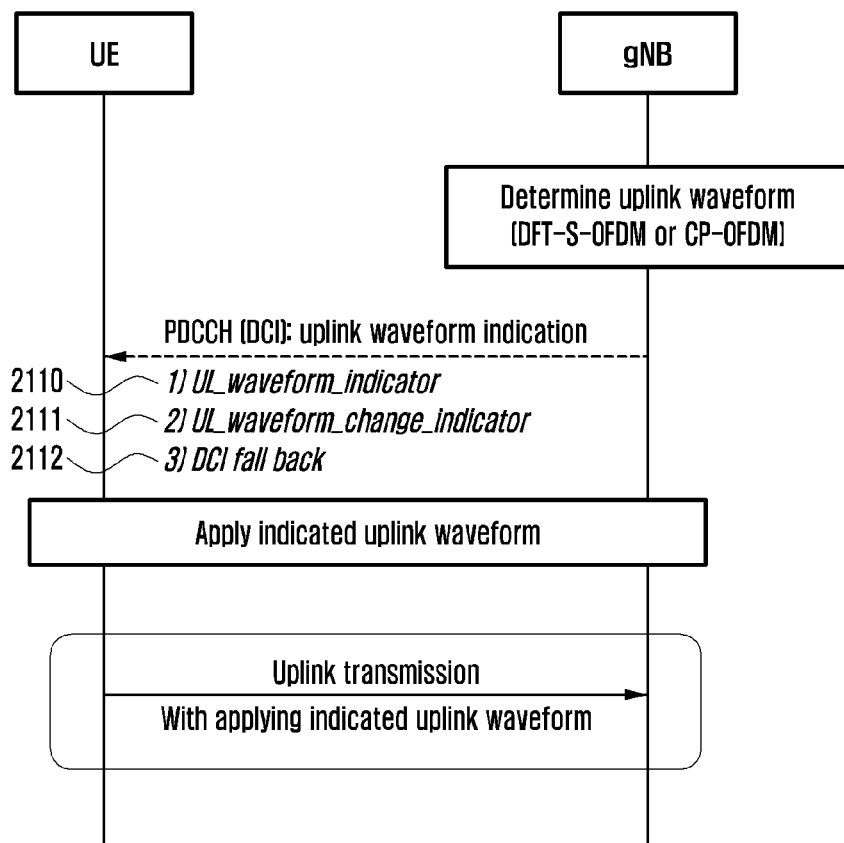
FIG. 21A illustrates a method in which a base station determines an uplink waveform and transmits information on a dynamic uplink waveform change to DCI transmitted on a PDCCH to a terminal according to an embodiment of the present disclosure.

FIG. 21A illustrates a method for determining, by a base station, an uplink waveform and transmitting, by a terminal, information on a dynamic uplink waveform change to a DCI transmitted on a PDCCH.

Figure 21B:
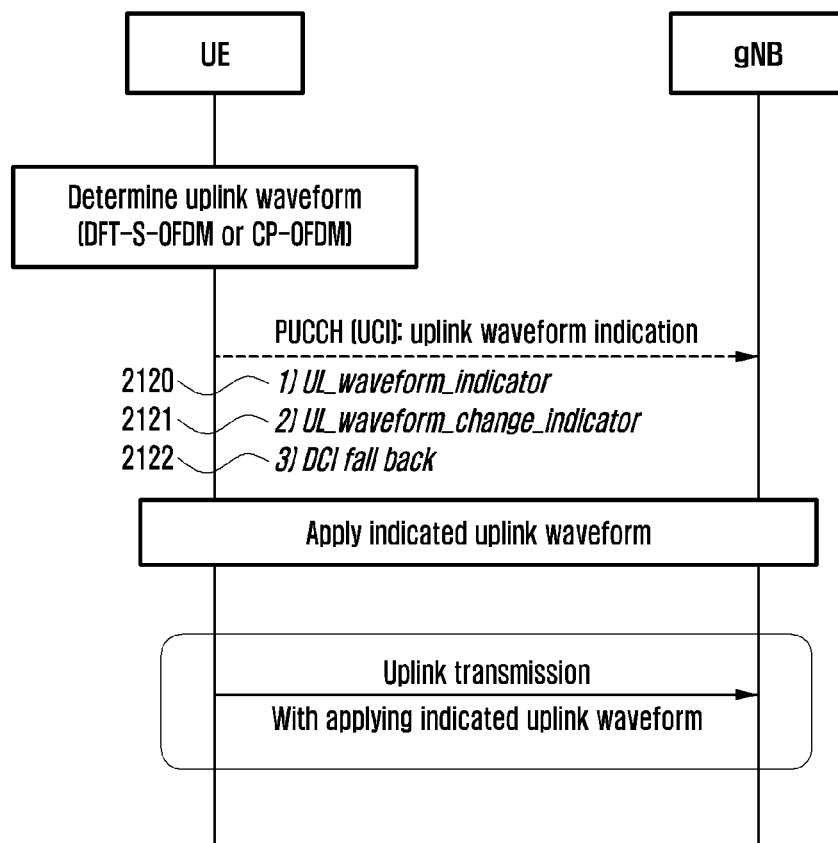
FIG. 21B illustrates a method for transmitting information on a dynamic uplink waveform change to UCI transmitted on a PUCCH as a method in which a terminal feeds back an uplink waveform to a base station and transmits an uplink waveform according to an embodiment of the present disclosure.

FIG. 21B illustrates a method of transmitting information on a dynamic uplink waveform change to a UCI transmitted on a PUCCH as a method in which the terminal feeds back the uplink waveform to the base station.

As an example of such an operation, as a method of adding a field explicitly indicating an uplink waveform to DCI, the base station may transmit information on an uplink waveform as a new field including UL_waveform_indicator 2120 and 2120 to a terminal through an information bit within DCI or other information bit within the PDCCH. t this time, for example, the base station may describe DFT-S-OFDM by "1" and CP-OFDM by "0" or DFT-S-OFDM by "0" and CP-OFDM by "1."

In addition to the above method of explicitly expressing the uplink waveform, as a method of indicating the UL waveform change, the base station may transmit information on an uplink waveform as a new field including UL_waveform_change_indicator 2111 and 2121 to the terminal through an information bit within DCI or other information bit within the PDCCH.

In this case, the base station may set the corresponding UL_waveform_change_indicator to be 0 when the same uplink waveform as the previously transmitted uplink waveform is used, and set the corresponding UL_waveform_change_indicator to be 1 when the uplink waveform is changed. Alternatively, on the contrary, the base station may set UL_waveform_change_indicator to be 1 when the same uplink waveform as the uplink waveform previously transmitted is used and set UL_waveform_change_indicator to be 1 when the uplink waveform is changed.

As described above, the base station may directly indicate the use of the DFT-S-OFDM or CP-OFDM through UL_waveform_indicator as a new field in the PDCCH at the PHY layer or inform the uplink waveform of new transmission compared with the previous transmission is changed.

Alternatively, there is an operation method using a DCI fallback 2112 and 2122 existing in the existing LTE. For example, if the previous uplink waveform is changed to indicate a new uplink waveform, the base station may indicate a change from DFT-S-OFDM to CP-OFDM or a change from CP-OFDM to DFT-S-OFDM using a DCI fallback.

Here, the uplink waveform, which is described as the previous uplink waveform, may be extended as follows: an operation based on an initial uplink (UL) waveform of the CP-OFDM or the DFT-S-OFDM set to be used for the uplink transmission of the RACH message3 (MSG3) to be used in an initial access.

In one example, an operation based on a reference uplink waveform is indicated to be determined as an uplink waveform, which is referenced, among two uplink waveforms, CP-OFDM, or DFT-S-OFDM after an initial transmission.

In one example, an operation indicates whether to change an uplink waveform based on an uplink waveform of a previous transmission as another embodiment.

In one example, a method for indicating, by a base station, whether to change an uplink waveform to a terminal through a DCI fallback, for example, at the time of changing from DFT-S-OFDM to CP-OFDM based on an initial uplink (UL) waveform reference, a reference uplink waveform reference, and an uplink waveform reference of a previous transmission as illustrated above or at the time of changing from additionally fixed uplink waveform CP-OFDM or DFT-S-OFDM to another uplink waveform.

A method for illustrating a method for indicating, by a base station, an uplink waveform change to a terminal through a DCI fallback at the time of changing from CP-OFDM, which is a fixed uplink waveform, to DFT-S-OFDM. The methods may be extended to the method for indicating, by a base station, an uplink waveform change to a terminal through a DCI fallback or the method of directly instructing a use of DFT-S-OFDM or CP-OFDM through UL_waveform_indicator; or the method for informing whether to change an uplink waveform of a new transmission with respect to the previous transmission through UL_waveform_change_indicator.

The method for a dynamic uplink waveform change indication in a PHY layer for a control signaling operation for a dynamic uplink waveform change indication can be extended to the method for an operation method based on a PDCCH and a DCI at a PHY layer when a base station transmits corresponding information to the terminal and the operation based on the PUCCH and the UCI when the terminal feeds back the uplink waveform related information to the base station. The method for a dynamic UL waveform change indication in a PHY layer can perform the uplink waveform change operation in a short time such as transmission time Interval (TTI) (about 1 msec in the LTE and about ⅛ in the NR (5G)), but has a disadvantage in that resources in the PDCCH and DCI (or PUCCH and UCI), which are relatively scarce resources, are fixedly consumed and it is impossible to support adaptive modulation and coding (AMC) and H-ARQ in the case of the PDCCH and the DCI (or PUCCH and UCI).

Figure 22A:
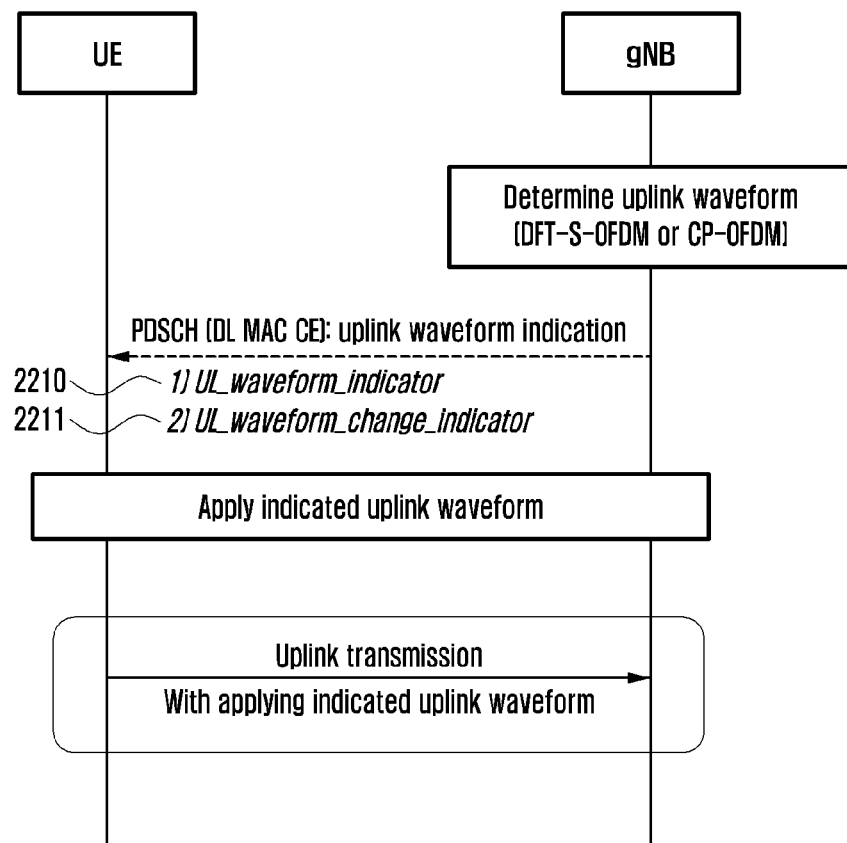
FIG. 22A illustrates a method in which a base station determines an uplink waveform and indicates the determined uplink waveform to a terminal by a downlink MAC CE according to an embodiment of the present disclosure.
Figure 22B:
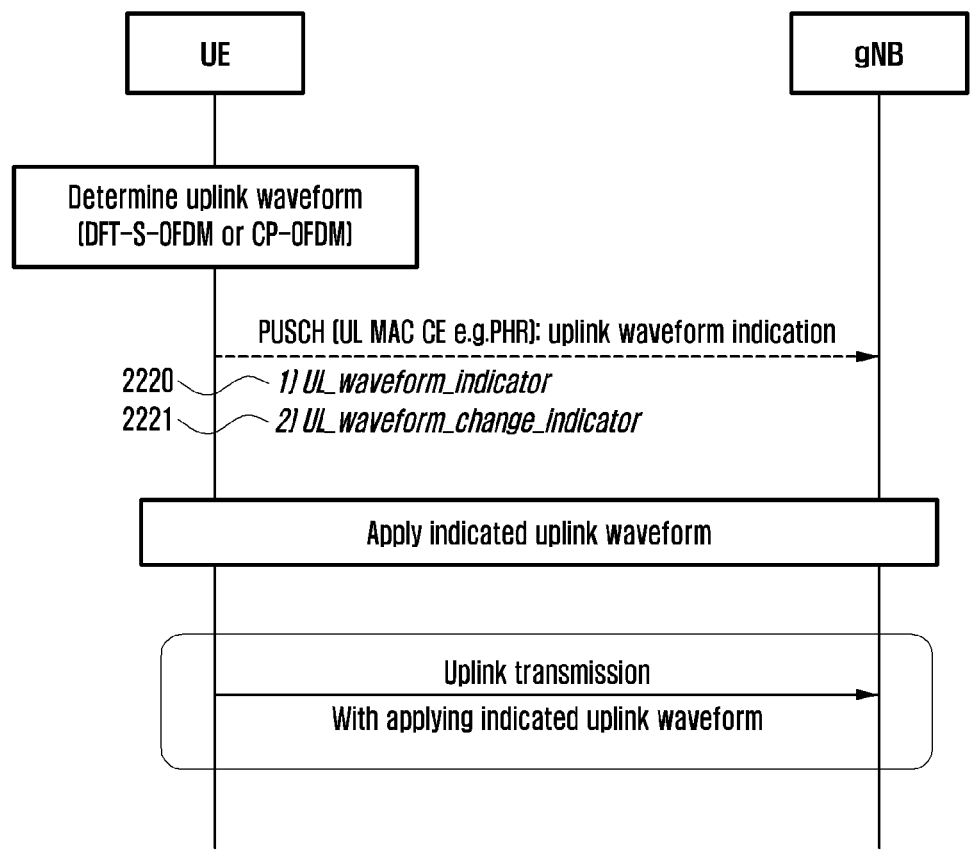
FIG. 22B illustrates a method in which a terminal indicates an uplink waveform to a base station using 2 bits reserved in one of the existing uplink MAC CEs according to an embodiment of the present disclosure.

FIGS. 22A and 22B illustrate a new downlink MAC CE (Control Element) for UL_waveform_indicator or UL_waveform_change_indicator transmission as an indication method in a MAC layer for a control signaling operation for a dynamic uplink waveform change indication according to a second embodiment.

FIG. 22A shows a method in which a base station determines an uplink waveform and instructs a terminal through a downlink MAC CE.

In FIG. 22, it is possible to transmit to the terminal whether the uplink waveform or the uplink waveform is changed in MACE through a new field UL_waveform_indicator 2210 or UL_waveform_change_indicator 2211.

In addition, FIG. 22B illustrates a method for transmitting UL_waveform_indicator 2220 or UL_waveform_change_indicator 2221 using 2 bits reserved in one PHR of the existing uplink MAC CE.

However, the transmission method through the MAC CE causes a delay of about 10 transmission time intervals (TTI) according to the transmission on the PDSCH (DL MAC CE) or the PUSCH (UL MAC, i.e., PHR) since the transmission is made on the data channel. In addition, the transmission method through the MAC CE has an advantage in that the transmission is made on the data channel and the support of the adaptive modulation and coding (AMC) and the H-ARQ can be made, the robust transmission is made.

Figure 23A:
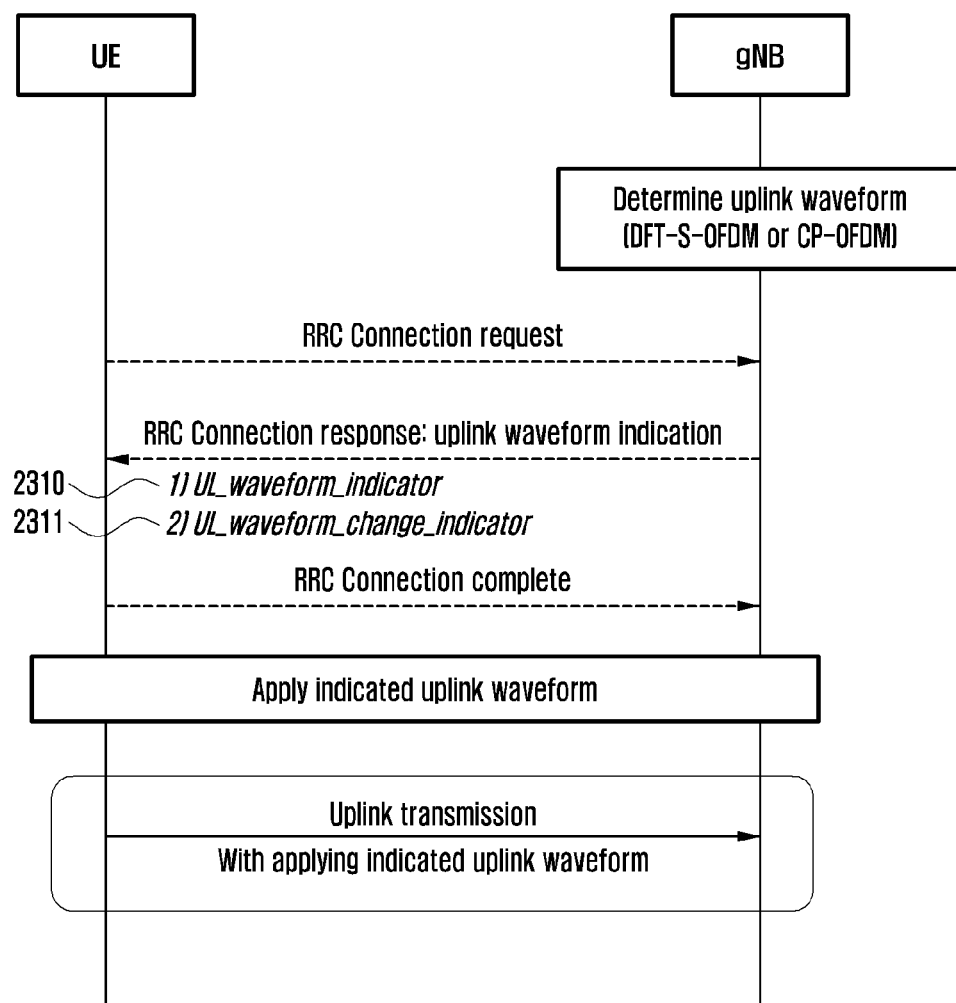
FIG. 23A illustrates a method for indicating, by a base station, a dynamic uplink waveform change to a terminal based on an RRC message as an indication method in an RRC layer for a control signaling operation for a dynamic uplink waveform change indication according to an embodiment of the present disclosure.

FIG. 23A illustrates a method for indicating, by a base station, a dynamic uplink waveform change to a terminal based on an RRC message as an indication method in an RRC layer for a control signaling operation for a dynamic uplink waveform change indication according to an embodiment of the present disclosure.

That is, the base station may transmit an uplink waveform or whether an uplink waveform is changed to an RRC configuration message or an RRC reconfiguration message by using UL_waveform_indicator 2310 or UL_waveform_change_indicator 2320 upon initial access.

The method has an advantage in that resources are not fixedly consumed on the PDCCH and the DCI (or PUCCH and UCI) which are scarce resources and for example, the MAC CE index or a reserved bit of the PHR of the existing MAC CE is not used in a communication standard for a new MAC CE. However, a time scale of RRC signaling can be applied to the case in which the uplink waveform configuration is slowly changed due to a delay of about 100 TTI. For example, when a control operation is performed with an RRC message due to a cell change (scell, PScell addition, handover and RRC state transition), a method for indicating, by a base station, an uplink waveform to a terminal by newly defining UL_waveform_indicator or UL_waveform_change_indicator as an RRC configuration message or a RRC reconfiguration message is provided.

Figure 23B:
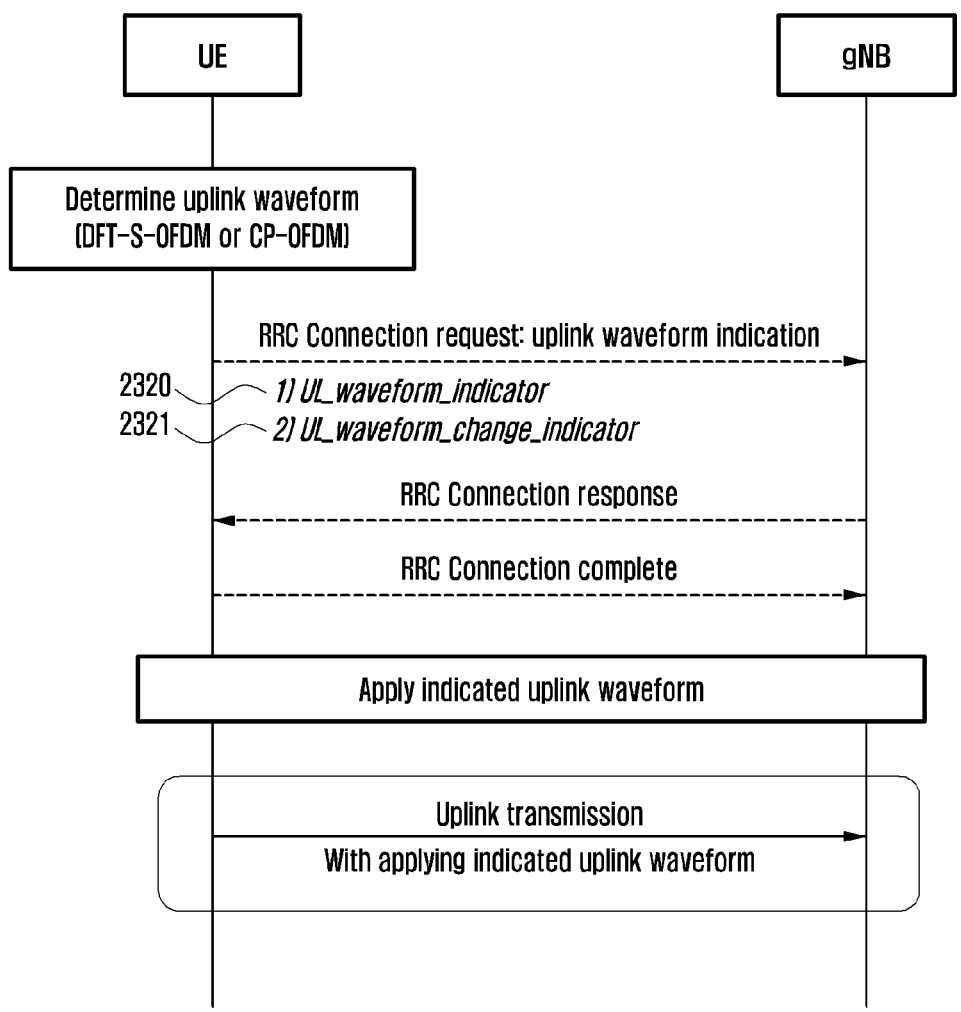
FIG. 23B illustrates a method for feeding back an uplink waveform indicator by allowing a terminal to use an RRC message according to an embodiment of the present disclosure.

FIG. 23B illustrates a method for feeding back, by a terminal, an uplink waveform indicator using an RRC message according to an embodiment of the present disclosure.

As shown in FIG. 23B, the terminal also includes an operation of feeding back the corresponding uplink waveform indicator (UL waveform indicator or UL_waveform_change_indicator) 2320 and 2321 to an RRC connection request message, an RRC configuration request message, or a reconfigured RRC reconfiguration request message.

Figure 24:
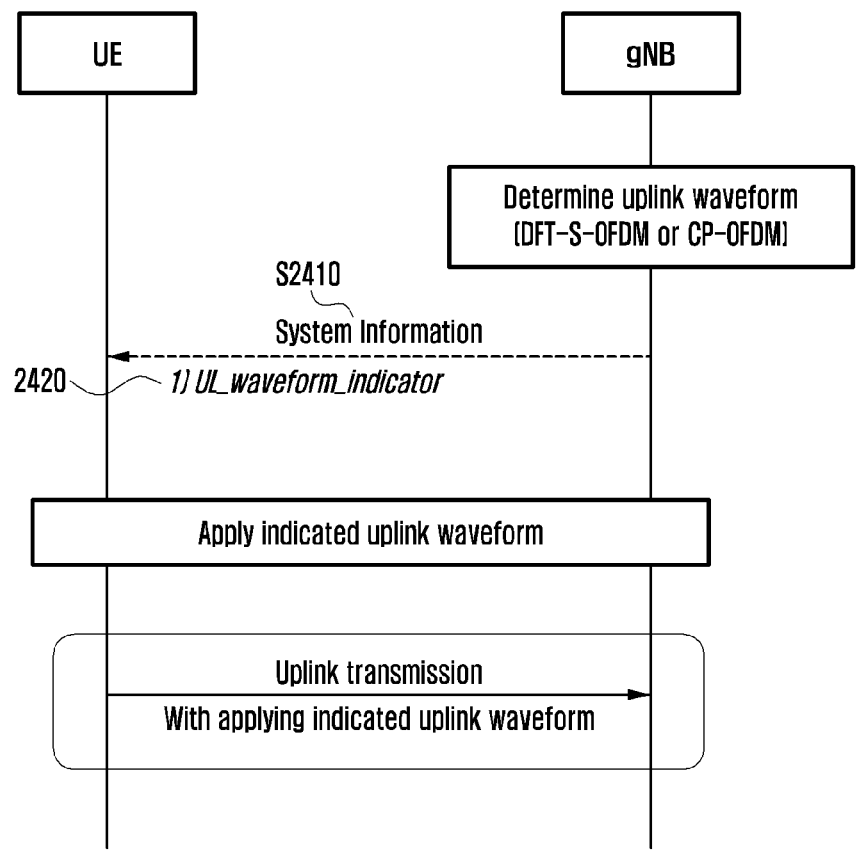
FIG. 24 illustrates an indication method for a base station to a terminal to carry UL_waveform_indicator information indicating an uplink waveform on fields such as MIB, SIB1, and SIB2 of system information as a method for indicating an uplink waveform by system information (SI) for a control signaling operation for a dynamic uplink waveform change indication according to an embodiment of the present disclosure.

As illustrated in FIG. 24, a fourth embodiment includes a method for indicating, by a base station, UL_waveform_indicator information to a terminal to carry the UL_waveform_indicator information indicating an uplink waveform on fields such as MIB, SIB1, and SIB2 of system information as a method for indicating an uplink waveform through system information (SI) for a control signaling operation for indicating a dynamic uplink waveform change according to an embodiment of the present disclosure.

The base station may indicate an uplink waveform by system information (S2410), which relates to an initial UL waveform indication method, and specifically, is suitable to set an UL waveform for an RACH MSG3 transmission. Since a terminal (RRC INACTIVE or RRC IDLE) that is not connected to a base station powers off an RF module and a receiving module for most of the time for a low power operation, the UE in the RRC IDLE state receives the system information prior to receiving paging during on duration in which CN-based paging (paging transmitted from the MME) is received or the UE in the RRC INACTIVE state receives the system information prior to receiving paging during on duration in which RAN-based paging (paging transmitted from anchor gNB) is received, thereby configuring the related information for the reception of the paging or performing the configuration required upon the initial access and the resource information (e.g., RACH resource and transmission mode configuration).

However, since the system information is always transmitted by the system and received by all the terminals within the base station cell, the transmission of the uplink waveform with a large number of information bits increases the control burden. Therefore, the base station may indicate that the CP-OFDM or DFT-S-OFDM is used as the uplink waveform by a minimum number of bits, for example, 1 bit. Since the terminal (RRC INACTIVE or RRC IDLE) not connected to the base station does not receive the system information frequently and moves to the corresponding base station in case of a mobile terminal and is operated based on the first received system information, the method for indicating an uplink waveform by system information (SI) directly (explicitly) indicates OFDM or DFT-S-OFDM as an uplink waveform through UL_waveform_indicator 2420. The method of indicating a change from a relative previous uplink waveform by UL_waveform_change_indicator is not suitable for the terminal which—does not receive the continuous reception.

In case of the terminal (RRC INACTIVE or RRC IDLE) not connected to the base station or a mobile terminal, since the terminal which moves to the corresponding base station and initially accesses the corresponding base station performs initial transmission with limited RACH resources and information, as the method for indicating an uplink waveform by the system information (SI), the method for indicating a waveform to be used for an uplink transmission of an RACH MSG3 which is the initial access is mainly used.

The present embodiment includes both of the method for transmitting information on an uplink waveform using MSB, SIB1, SIB2, or then SIBx and minimum SI and a method for transmitting and indicating information on the uplink waveform to remaining minimum system information (RMSI) or other SI or on-demand other SI according to a terminal request. In addition, the method for using system information may be used to indicate a reference uplink waveform which is a reference of an uplink waveform in the next RRC connected state and a dynamic uplink waveform indication immediately applied to the uplink transmission as well as the method for indicating a waveform to be used for an uplink transmission of RACH MSG3 which is the system information initial access.

Figure 25:
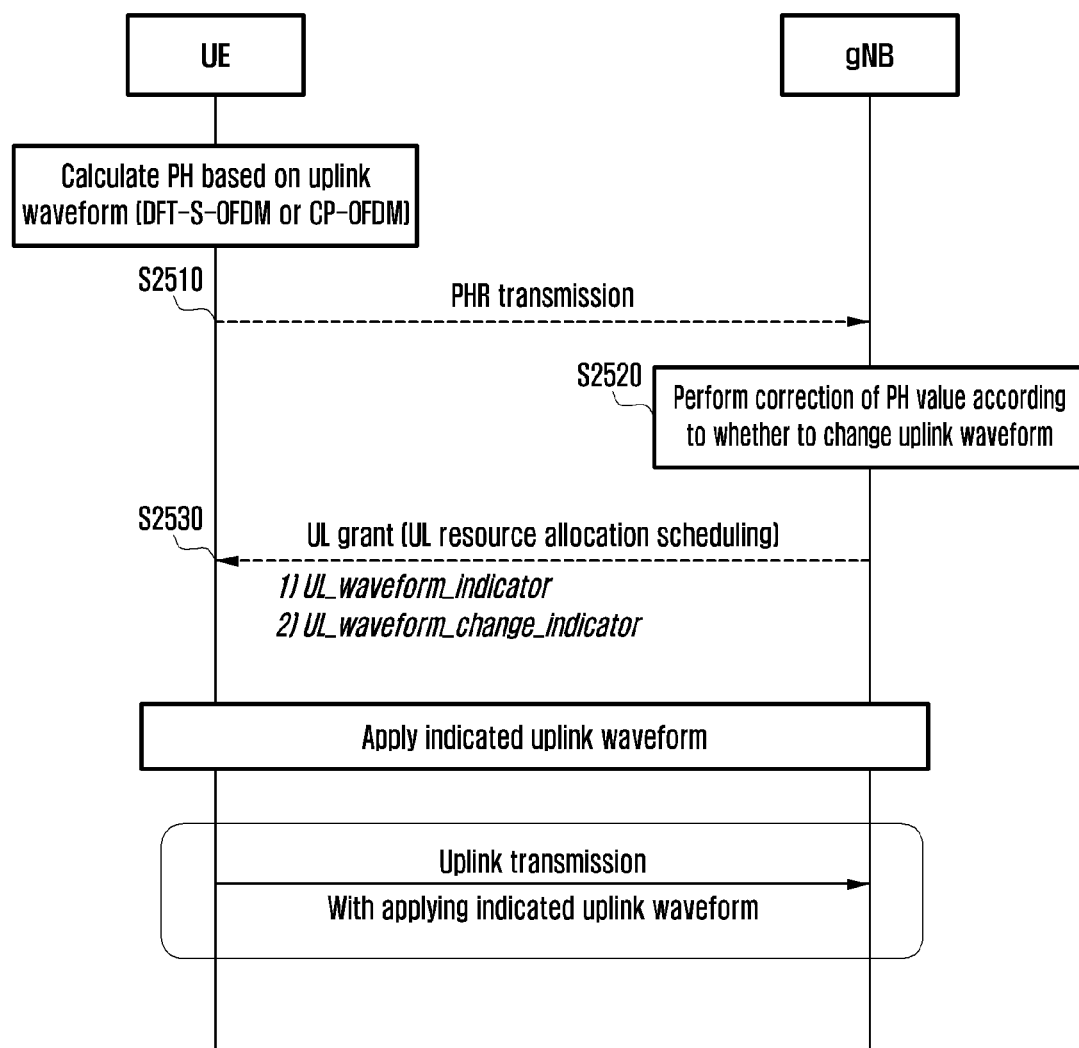
FIG. 25 illustrates an operation of calculating, by a terminal, a PHR and reporting the calculated PHR to allow a base station to perform UL scheduling based on the corresponding information according to an embodiment of the present disclosure.
Figure 26:
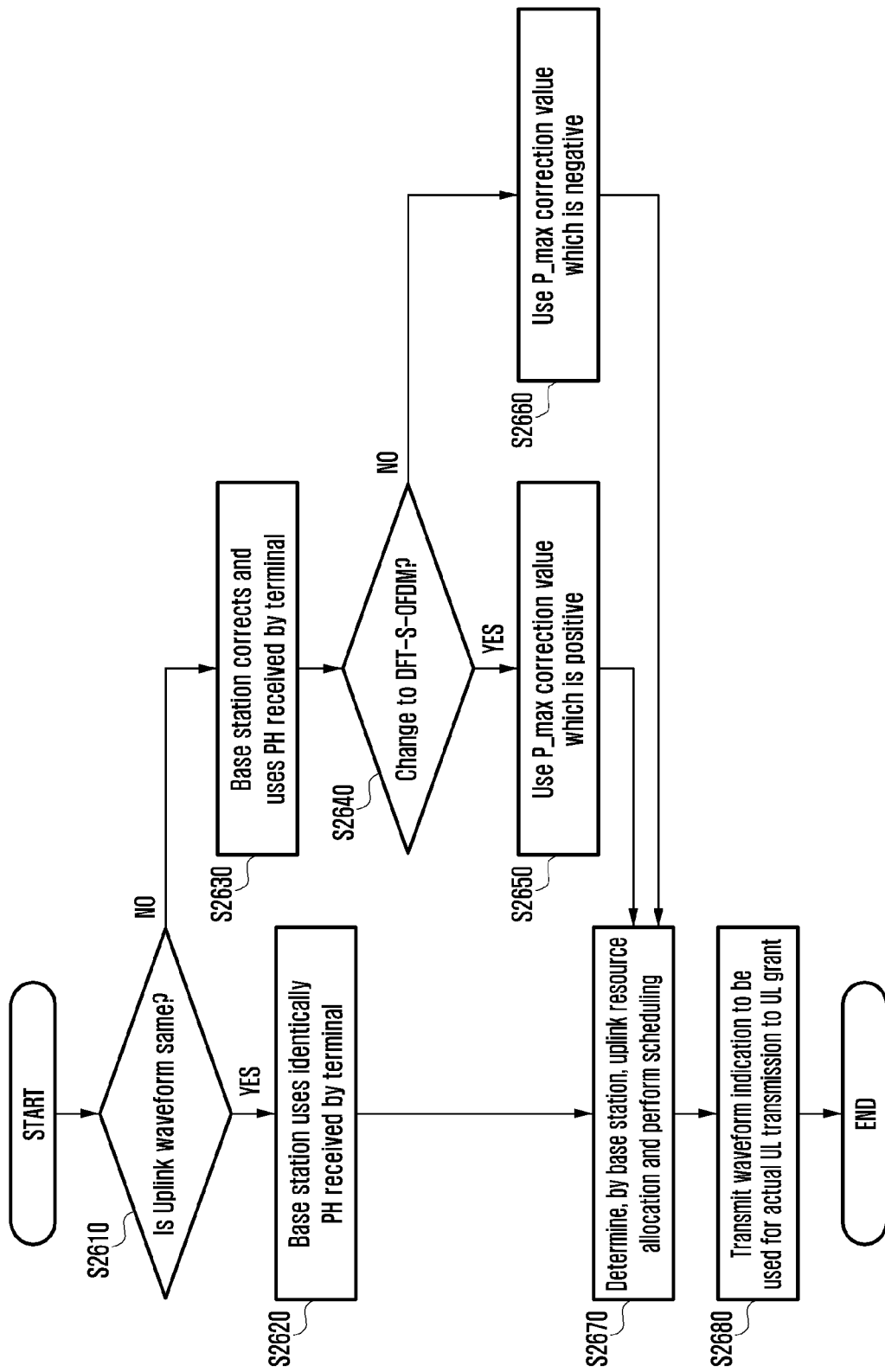
FIG. 26 illustrates an operation of allocating an uplink resource and performing scheduling by correcting a PH reception value and correcting P_max based on an uplink waveform as a reference in a PHR transmitted from a terminal and a waveform to be applied to an actual uplink transmission.

FIG. 25 illustrates an operation of calculating, by a terminal, a PHR and reporting the calculated PHR and performing, by a base station, UL scheduling with corresponding information.

The base station and the terminal performs the uplink transmission based on the PHY layer indication method (PDCCH/DCI, or PUCCH/UCI) for the control signaling operation for the dynamic uplink waveform change indication, the indication method by a MAC CE in the MAC layer, the indication method by an RRC message in an RRC layer, and the indication method by the system information.

In particular, there is a need to determine a P_max value which is a reference when the terminal calculates the PH to transmit the PHR in the PHR report for the uplink power control. By the way, the value is changed according to the uplink waveform. The DFT-S-OFDM has a lower peak-to-average power ratio (PAPR) than that of the CP-OFDM. Therefore, the DFT-S-OFDM has a larger P_max value which can be output, compared with the CP-OFDM. That is, in order to support the high PAPR of the CP-OFDM, a power amplifier (PA) having a wide linear region is required, which can increase the price of the terminal. Therefore, in order to support different waveforms using the same PA in the same terminal, back-off of the transmission power may be performed in order to reduce the amount of signals out of a linear region of PA due to high PAPR when the CP-OFDM may be used.

In this case, by the explicit method, the fact that the terminal performs the back-off using the CP-OFDM may be included in the power headroom information. More specifically, a bit P notifying whether or not the terminal performs back-off is defined in the power headroom information. If the back-off is performed, P may be set to be "1." Also, if the terminal has performed the back-off of the transmission power due to the use of the CP-OFDM, the $P_{CMAX}$ specified in the above Equations 3a, 3b, and 3c may be changed to $\overline{P}_{CMAX}$. At this time, $\overline{P}_{CMAX}=P_{CMAX}-\Delta$ and $\Delta$ is a back-off value that the terminal performs.

In addition to the explicit method as described above, the present embodiment relates to the reference uplink waveform indication method, and the method for transmitting a reference waveform indication to determine a P_max value which is a reference when the terminal calculates the PH to transmit the PHR.

Since the base station determines the uplink waveform, the base station can know the uplink waveform at the time of the uplink scheduling, but the terminal cannot know the accurate uplink waveform information because of previously feeding back the PHR information.

Therefore, according to the present embodiment, first, a method for explicitly indicating, by a terminal, a reference uplink waveform (DFT-S-OFDM or CP-OFDM) at the time of a PHR transmission (S2510) and a method for figuring out, by a base station receiving the reference uplink waveform, corresponding uplink waveform indication information and applying a P_max correction value when being different from an actual uplink waveform (S2520) to perform uplink scheduling (determining uplink resource allocation and the number of allocated sub carriers) (S2530) are provided.

Second, a method for explicitly indicating, by a terminal, a reference uplink waveform (DFT-S-OFDM or CP-OFDM) at the time of the PHR transmission (S2510) and a method for limiting, by a base station receiving the reference uplink waveform, a corresponding uplink waveform to perform the uplink scheduling (determining uplink resource allocation and the number of allocated sub carriers) (S2530) are provided.

Third, the base station and the terminal define the P_max value based on the pre-defined reference uplink waveform and calculate the PH based on the defined P_max value to transmit the PHR. The base station receiving the same may include a method for setting the P_max correction value to be 0 if the reference uplink waveform and the reference uplink waveform to be actually used are the same, and being operated by applying the P_max correction value which is the predefined or implemented value if the reference uplink waveform and the reference uplink waveform to be actually used are different.

Figure 28:
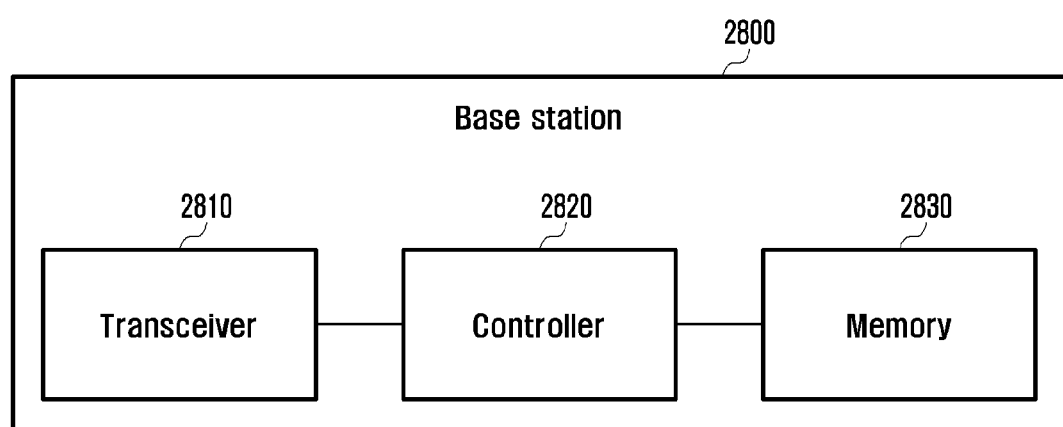
FIG. 28 illustrates a structure of the base station according to an embodiment of the present disclosure.

FIG. 28 illustrates an operation of that the base station determines whether the uplink waveform which is a reference in the PHR transmitted by the terminal and the waveform to be applied to the actual uplink transmission are the same (S2610), and corrects the PH reception value and P_max if it is determined that the uplink waveform included in the PHR and the waveform to be applied to the actual uplink transmission are different (S2640) to allocate and schedule the uplink resource.

Further, the base station identifies whether the uplink waveform is changed to DFT-S-OFDM (S2640).

Since the feasible P_max value of the DFT-S-OFDM is larger than that of the CP-OFDM, the uplink waveform of the PHR value transmitted by the terminal (explicit uplink waveform or reference uplink waveform) is DFT-S-OFDM. If the uplink waveform at the time of the actual uplink allocation by the base station becomes the CP-OFDM, the P_max correction value becomes negative (S2660) and the base station adds the corresponding negative P_max correction value to the PH value received from the terminal, which is used for the uplink scheduling (determining uplink resource allocation and the number of allocated sub carriers) (S2670).

On the contrary, the uplink waveform (explicit uplink waveform or reference uplink waveform) of the PHR value transmitted by the terminal is the CP-OFDM, and if the uplink waveform at the time of the actual uplink allocation of the base station becomes the DFT-S-OFDM, the P_max correction value becomes positive (S2650), and the base station adds the corresponding positive P_max correction value to the PH value received from the terminal, which is used for the uplink scheduling (determining uplink resource allocation and the number of allocated sub carriers) (S2670).

The base station and the terminal performs the uplink transmission based on the PHY layer indication method (PDCCH/DCI, or PUCCH/UCI) for the control signaling operation for the uplink waveform indication, the indication method by a MAC CE in the MAC layer, the indication method by an RRC message (including configuration/information reconfiguration procedure) in an RRC layer, and the indication method by the system information.

Also, the base station includes a transmission of a waveform Indication to be used for an actual UL transmission in an UL grant in an operation of performing uplink resource allocation determination and scheduling (S2680).

This uplink waveform indication indicator indicates whether the corresponding uplink waveform is an initial uplink waveform indication for initial access (RACH MSG3) or a reference uplink waveform indication for a (default) uplink waveform indication which is a basic reference in the connected state or whether the corresponding uplink waveform indication is an immediate uplink waveform indication to be applied to an actual uplink transmission later.

The method defining uplink waveform indication according to the layer of the control signal for transmitting the uplink waveform indication includes, for example, the example in which the uplink waveform indication information transmitted by the system information is the initial uplink waveform indication, the information transmitted by the RRC signaling is the reference uplink waveform indication, the information transmitted by the PHR MAC CE or the UL Grant is the immediate uplink waveform indication is provided, and all the cases in which the control transmission protocol layer and the control signaling are mapped by the initial/reference/immediate uplink waveform indication are extendable provided.

The following Table 5 is an example in which the control transmission protocol layer and the control signaling are mapped to the initial/reference/immediate uplink waveform indication.

TABLE 5

| Control transmission protocol layer and control signaling | Mapping information uplink waveform indication type |
|---|---|
| System Information | Initial uplink waveform indication |
| RRC signalling | Reference uplink waveform indication |
| MAC CE (i.e., PHR) | Reference or Immediate uplink waveform indication |
| UL grant | Immediate uplink waveform indication |

There is ambiguity if the relationship that the control transmission protocol layer and the control signaling are mapped to the initial/reference/immediate uplink waveform indication is not a one-to-one mapping. In Table 5, the MAC CE (i.e., PHR) shows an example of indicating both a reference and an immediate uplink waveform indication.

In this case, in addition to the uplink waveform indication, the information about the type of the uplink waveform indication, that is, the initial/reference/immediate uplink waveform indication may be provided to eliminate the ambiguity of determination between the terminal and the base station.

In one embodiment of this operation, in addition to the uplink waveform indication, a type of an uplink waveform indication is defined as, for example, 2 bits, and the following operation is performed. The indication of the type of the uplink waveform indication includes logically extendable cases.

The following table 6 shows the type information bits for the uplink waveform indication.

TABLE 6

| Type information bits | |
|---|---|
| Uplink waveform indication informaiton bit 2 bit | uplink waveform indication type |
| 00 | Initial uplink waveform indication |
| 01 | Reference uplink waveform indication |
| 10 | Immediate uplink waveform indication |
| 11 | Reserved |

Figure 27:
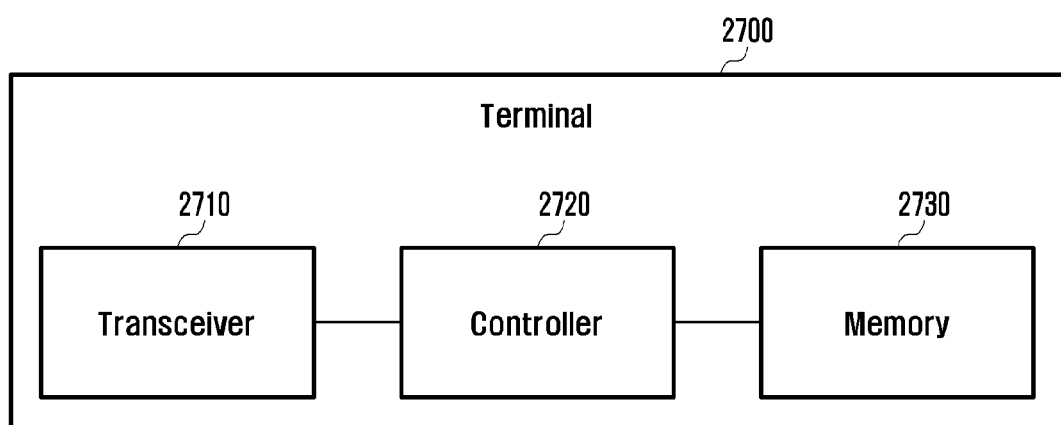
FIG. 27 illustrates a structure of the terminal according to an embodiment of the present disclosure.

FIG. 27 illustrates a structure of the terminal according to an embodiment of the present disclosure.

Referring to FIG. 27, a terminal 2700 may include a transceiver 2710, a controller 2720, and a memory 2730. In the present disclosure, the controller 2720 may be defined as a circuit, an application specific integrated circuit, or at least one processor.

The transceiver 2720 may transmit and receive signals to and from other network entities. The transceiver 2710 may report, for example, the beam measurement information to the base station, and receive the beam change command message. Further, for example, the transceiver 2710 may report the PHR and receive the information on the uplink waveform from the base station.

The controller 2720 may control the overall operation of the terminal according to the embodiment of the present disclosure. For example, the controller 2720 may control a signal flow between each block to perform the operation according to the above-described flow chart.

The memory 2730 may store at least one of the information transmitted/received through the transceiver 2710 and the information generated through the controller 2720.

FIG. 28 illustrates a configuration of a base station according to an embodiment of the present embodiment.

Referring to FIG. 28, the base station 2800 may include a transceiver 2810, a controller 2820, and a memory 2830. In the present disclosure, the controller 2820 may be defined as a circuit, an application specific integrated circuit, or at least one processor.

The transceiver 2810 may transmit and receive a signal to and from another network entity. The transceiver 2810 may receive, for example, the beam measurement information from the base station, and transmit the beam change command message. Further, for example, the transceiver 2810 may receive the PHR and transmit the information on the uplink waveform to the terminal.

The controller 2820 may control the overall operation of the terminal according to the embodiment of the present disclosure. For example, the controller 2820 may control a signal flow between each block to perform the operation according to the above-described flow chart.

The memory 2830 may store at least one of the information transmitted/received through the transceiver 2810 and the information generated through the controller 2820.

Meanwhile, in the drawings illustrating a method in embodiments, the order of description does not necessarily correspond to the order of execution, and the order relationship may be changed or executed in parallel.

Alternatively, the drawings illustrating the method of the present disclosure may omit some of the elements and may include only some of the elements without impairing the essence of the present disclosure.

Further, the method of the present disclosure may be carried out in combination with some or all of the contents included in each embodiment without departing from the essence of the present disclosure Meanwhile, the exemplary embodiments of the present disclosure disclosed in the present specification and the accompanying drawings have been provided only as specific examples in order to help understand the present disclosure and do not limit the scope of the present disclosure. That is, it is obvious to those skilled in the art to which the present disclosure pertains that other change examples based on the technical idea of the present disclosure may be made without departing from the scope of the present disclosure. Further, each embodiment may be combined and operated as needed.

Although the present disclosure has been described with various embodiments, various changes and modifications may be suggested to one skilled in the art. It is intended that the present disclosure encompass such changes and modifications as fall within the scope of the appended claims.

What is claimed is:

1. A method of a terminal in a wireless communication system, the method comprising:
   receiving, from a base station, system information including first uplink waveform information for msg3 transmission;
   transmitting, to the base station, an msg3 based on the first uplink waveform information;
   receiving, from the base station, a radio resource control (RRC) message;
   transmitting, to the base station, data based on second uplink waveform information in case that the RRC message includes the second uplink waveform information; and
   transmitting, to the base station, the data based on the first uplink waveform information in case that the RRC message does not include the second uplink waveform information.

2. The method of claim 1, wherein each of the first uplink waveform information and the second uplink waveform information indicates whether to enable discrete fourier transform-spread-orthogonal frequency division multiplexing (DFT-S-OFDM).

3. The method of claim 1, wherein the system information including the first uplink waveform information is remaining minimum system information (RMSI).

4. The method of claim 1, wherein the data is transmitted using at least one of cyclic prefix-orthogonal frequency division multiplexing (CP-OFDM) or discrete fourier transform-spread-orthogonal frequency division multiplexing (DFT-S-OFDM) based on the first uplink waveform information or the second uplink waveform information.

5. A method of a base station in a wireless communication system, the method comprising:
   transmitting, to a terminal, system information including first uplink waveform information for msg3 transmission;
   receiving, from the terminal, an msg3 based on the first uplink waveform information;
   transmitting, to the terminal, a radio resource control (RRC) message;
   receiving, from the terminal, data based on second uplink waveform information in case that the RRC message includes the second uplink waveform information; and receiving, from the terminal, data based on the first uplink waveform information in case that the RRC message does not include the second uplink waveform information.

6. The method of claim 5, wherein each of the first uplink waveform information and the second uplink waveform information indicates whether to enable discrete fourier transform-spread-orthogonal frequency division multiplexing (DFT-S-OFDM).

7. The method of claim 5, wherein the system information including the first uplink waveform information is remaining minimum system information (RMSI).

8. The method of claim 5, wherein the data is transmitted using at least one of cyclic prefix-orthogonal frequency division multiplexing (CP-OFDM) or discrete fourier transform-spread-orthogonal frequency division multiplexing (DFT-S-OFDM) based on the first uplink waveform information or the second uplink waveform information.

9. A terminal in a wireless communication system, the terminal comprising:
a transceiver; and
a controller coupled with the transceiver and configured to:
receive, from a base station, system information including first uplink waveform information for msg3 transmission,
transmit, to the base station, an msg3 based on the first uplink waveform information,
receive, from the base station, a radio resource control (RRC) message,
transmit, to the base station, data based on second uplink waveform information in case that the RRC message includes the second uplink waveform information, and
transmit, to the base station, the data based on the first uplink waveform information in case that the RRC setup message does not include the second uplink waveform information.

10. The terminal of claim 9, wherein each of the first uplink waveform information and the second uplink waveform information indicates whether to enable discrete fourier transform-spread-orthogonal frequency division multiplexing (DFT-S-OFDM).

11. The terminal of claim 9, wherein the system information including the first uplink waveform information is remaining minimum system information (RMSI).

12. The terminal of claim 9, wherein the data is transmitted using at least one of cyclic prefix-orthogonal frequency division multiplexing (CP-OFDM) or discrete fourier transform-spread-orthogonal frequency division multiplexing (DFT-S-OFDM) based on the first uplink waveform information or the second uplink waveform information.

13. A base station in a wireless communication system, the base station comprising:
a transceiver; and
a controller coupled with the transceiver and configured to:
transmit, to a terminal, system information including first uplink waveform information for msg3 transmission,
receive, from the terminal, an msg3 based on the first uplink waveform information,
transmit, to the terminal, a radio resource control (RRC) message,
receive, from the terminal, data based on second uplink waveform information in case that the RRC message includes the second uplink waveform information, and
receive, from the terminal, data based on the first uplink waveform information in case that the RRC message does not include the second uplink waveform information.

14. The base station of claim 13, wherein each of the first uplink waveform information and the second uplink waveform information indicates discrete fourier transform-spread-orthogonal frequency division multiplexing (DFT-S-OFDM).

15. The base station of claim 13, wherein the system information including the first uplink waveform information is remaining minimum system information (RMSI).

16. The base station of claim 13, wherein the data is transmitted using at least one of cyclic prefix-orthogonal frequency division multiplexing (CP-OFDM) or discrete fourier transform-spread-orthogonal frequency division multiplexing (DFT-S-OFDM) based on the first uplink waveform information or the second uplink waveform information.

* * * * *